United States Patent [19]
Anderson

[11] Patent Number: 6,064,985
[45] Date of Patent: May 16, 2000

[54] AUTOMATED PORTFOLIO MANAGEMENT SYSTEM WITH INTERNET DATAFEED

[75] Inventor: Leroy E. Anderson, Boise, Id.

[73] Assignee: Assured Equities, Inc., Boise, Id.

[21] Appl. No.: 09/010,419

[22] Filed: Jan. 21, 1998

[51] Int. Cl.[7] .................................................. G06F 17/60
[52] U.S. Cl. .............................................................. 705/36
[58] Field of Search ............................................... 705/36

[56] References Cited

U.S. PATENT DOCUMENTS

| | | | |
|---|---|---|---|
| 4,346,442 | 8/1982 | Musmanno | 364/408 |
| 4,823,265 | 4/1989 | Nelson | 364/408 |
| 5,126,936 | 6/1992 | Champion et al. | 364/408 |
| 5,132,899 | 7/1992 | Fox | 364/408 |
| 5,193,056 | 3/1993 | Boes | 364/408 |
| 5,262,942 | 11/1993 | Earle | 364/408 |
| 5,612,682 | 3/1997 | Deluca et al. | 340/825.34 |
| 5,644,727 | 7/1997 | Atkins | 395/240 |
| 5,675,746 | 10/1997 | Marshall | 395/235 |
| 5,884,286 | 3/1999 | Daughtery, III | 705/36 |

OTHER PUBLICATIONS

Gustav Lund & Seppo Rantanen, "Safe and Efficient Equity Plays", Corporate Finance, pp. 49–53, Jun. 1993.
Peter Tufano, "How Financial Engineering Can Advance Corporate Strategy", Harvard Business Review, pp. 136–146, Jan.–Feb. 1996.
John Russell Holmes, "100 Years of Common–Stock Investing", Financial Analysts Journal, vol. 30, No. 6, pp. 38–44, 85 (only abstract cited), Nov. 1974.
Andrew Tanzer, "The Three Chinas Boom", Forbes, vol. 150, No. 1, p. 47, Jul. 6, 1992.

*Primary Examiner*—Allen R. MacDonald
*Assistant Examiner*—Susanna Meinecke-Díaz
*Attorney, Agent, or Firm*—Robert L. Shaver; Frank J. Dykas

[57] ABSTRACT

An automated portfolio management system and method which manages data in a database, and populates the database with data from a data feed off the Internet. The system utilizes double leveraging of funds and purchased index puts as insurance against market downturns, to generate a guaranteed high yield. The double leveraging is accomplished by selling covered calls and using a formula to determine the maximum amount to borrow against the portfolio, and using income from both sources to purchase additional stock. The high yield from the portfolio is protected from market downturns by index puts.

35 Claims, 13 Drawing Sheets

| FILE | EDIT | VIEW | TOOLS | WINDOW | HELP |

PARAMETERS WINDOW
COVERED CALLS
　　　%ST ____ % ____ % GOAL 0
　　　%MID ____ % ____ % GOAL 0
　　　%LEAP ____ % ____ % GOAL 0

CURRENT ANNUALIZED v POTENTIAL: ____ % 0
　　　INDUSTRIAL ____ % ____ % GOAL 0
　　　TRANSPORTATION ____ % ____ % GOAL 0
　　　FINANCIAL ____ % ____ % GOAL 0

INSURANCE 0
　NEEDED 0 NOT NEEDED
　MAXIMUM $ TO BE BORROWED IS ADEQUATE 0
　IS NOT ADEQUATE 0

DIVERSIFICATION
　　　VALUE ____ % ____ % GOAL 0
　　　GROWTH ____ % ____ % GOAL 0
　　　INCOME ____ % ____ % GOAL 0
　　　CYCLICAL ____ % ____ % GOAL 0
　　　FOREIGN ____ % ____ % GOAL 0

CURRENT TIME VALUE $ ____
　　　HIGH BETA ____ % ____ % GOAL 0
　　　LOW SAFETY ____ % ____ % GOAL 0
　　　TIMELINESS SAFETY ____ % ____ % GOAL 0

FIG. 5

| FILE | EDIT | VIEW | TOOLS | HELP |
|---|---|---|---|---|
| NEW | OPTIONS FOR YIELD | PORTFOLIO | INPUT DATA | TOPICS |
| OPEN | OPTIONS FOR TIME VALUE | LIST 1 | RECALCULATE | INDEX |
| SAVE | STOCK FOR REPRESENTATION | LIST 2 | CALCULATE LIST STOCKS | GLOSSARY |
| SAVE AS | STOCK FOR TYPE | LIST 3 | PRINT ACTION LIST | FLOW CHARTS |
| PROPERTIES | STOCK FOR RELEVANCE | TOOLBARS | | ABOUT |
| TEMPLATES | STOCK FOR YIELD | CALL OPTIONS SOLD | | |
| PRINT | PARAMETERS | PUT OPTIONS SOLD | | |
| RECENT | PUT OPTIONS SOLD | PUT OPTIONS BOUGHT | | |
| EXIT | PUT OPTIONS BOUGHT | | | |
| | CALL OPTIONS SOLD | | | |

FIG. 6

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| Quantity | Stock | Price | Cost | Annualized Dividend | Call Contracts Sold | Call Strike Date | Put Contracts Sold | Put Strike Date | Strike Price | Value of Puts Sold | Premiums Received | Annualized Fairly Secure Total | Possible Additional Total |
| 1,000 | Applied Materials | 61 5/8 | $ 61,960.00 | $ - | 10 | 01/16/99 | | | 60 | 0 | $ 18,216.00 | $ 10,210.00 | $ - |
| 1,000 | Bell Atlantic Corp | 74 7/8 | $ 75,250.00 | $ 2,960.00 | 10 | 07/18/97 | | | 75 | 0 | $ 1,550.00 | $ 21,560.00 | $ 125.00 |
| 1,000 | Boeing Co | 57 5/8 | $ 57,950.00 | $ 560.00 | 10 | 01/16/99 | | | 57 1/2 | 0 | $ 10,874.00 | $ 7,174.00 | $ - |
| | Boeing Co | 57 5/8 | $ - | $ - | | | 10 | 01/16/99 | 57 1/2 | 57500 | $ 6,023.00 | $ 3,706.00 | $ - |
| 1,000 | Bristol Myers Squibb | 79 1/8 | $ 79,515.00 | $ 1,520.00 | 10 | 01/16/98 | | | 80 | 0 | $ 5,899.00 | $ 11,632.00 | $ 1,500.00 |
| 1,000 | Compaq Computer | 100 1/2 | $ 100,950.00 | $ - | 10 | 01/16/98 | | | 100 | 0 | $ 14,234.00 | $ 24,401.00 | $ - |
| 1,000 | Deere & Co | 54 3/4 | $ 55,070.00 | $ 800.00 | 10 | 07/18/97 | | | 55 | 0 | $ 1,550.00 | $ 19,400.00 | $ 1,500.00 |
| | Dell Computer | 112 3/16 | $ - | $ - | | | 10 | 01/16/98 | 100 | 100000 | $ 10,000.00 | $ 17,142.00 | $ - |
| 1,000 | Diebold Inc | 38 5/8 | $ 38,896.00 | $ 500.00 | 10 | 11/21/97 | | | 35 | 0 | $ 5,224.00 | $ 5,658.00 | $ 3,300.00 |
| | Diebold Inc | 38 5/8 | $ - | $ - | | | 10 | 11/21/97 | 40 | 40000 | $ 4,034.00 | $ 6,382.00 | $ 3,000.00 |
| 1,000 | Ericsson Tel "B" Ads | 39 | $ 39,270.00 | $ 280.00 | 10 | 10/17/97 | | | 40 | 0 | $ 2,544.00 | $ 7,912.00 | $ 3,000.00 |
| | Ericsson Tel "B" Ads | 39 | $ - | $ - | | | 10 | 10/17/97 | 40 | 40000 | $ 2,906.00 | $ 5,718.00 | $ - |
| 1,000 | Dollar General | 35 7/8 | $ 36,140.00 | $ 200.00 | 10 | 11/21/97 | | | 35 | 0 | $ 4,034.00 | $ 7,781.00 | $ - |
| 1,000 | General Electric | 65 1/4 | $ 65,600.00 | $ 1,337.00 | 10 | 01/16/98 | | | 65 | 0 | $ 5,277.00 | $ 10,383.00 | $ - |
| 1,000 | Johnson & Johnson | 64 3/8 | $ 64,725.00 | $ 880.00 | 10 | 07/18/97 | | | 65 | 0 | $ 1,799.00 | $ 22,468.00 | $ 7,500.00 |
| 1,000 | LSI Logic | 35 1/4 | $ 35,510.00 | $ - | 10 | 10/17/97 | | | 35 | 0 | $ 5,168.00 | $ 15,504.00 | $ - |
| 1,000 | MBNA Corp | 36 3/8 | $ 36,635.00 | $ 480.00 | 10 | 01/16/98 | | | 35 | 0 | $ 5,277.00 | $ 7,169.00 | $ - |
| 1,000 | Merrill Lynch | 60 1/8 | $ 60,460.00 | $ 800.00 | 10 | 01/16/98 | | | 60 | 0 | $ 6,769.00 | $ 12,189.00 | $ - |
| 1,000 | Phillip Morris Cos | 44 1/2 | $ 44,786.00 | $ 1,600.00 | 10 | 01/16/99 | | | 46 5/8 | 0 | $ 7,267.00 | $ 6,072.00 | $ 1,308.00 |
| 1,000 | Watson Pharmeceuticals | 42 3/4 | $ 43,030.00 | $ - | 10 | 11/21/97 | | | 40 | 0 | $ 6,398.00 | $ 8,755.00 | $ - |
| 1,000 | Micron Technology | 38 7/8 | $ 39,145.00 | $ 200.00 | 10 | 01/16/00 | | | 30 | 0 | $ 17,469.00 | $ 3,474.00 | $ - |
| | | | $ 934,892 | $ 12,117.00 | | | | | | $ 237,500.00 | $ 142,512.00 | $ 234,690.00 | $ 21,233.00 |
| | | | | | | | | | | | $ (58,200.00) | $ (35,815.00) | |
| | | | | | | | | | | | | $ 170,435.00 | |

At risk Value = $ 1,029,880.00
Annualized Yield = 34.09%
Possible Yield = 38.33%

TABLE 1

FIG. 7

| 1 | 2 | 3 | 4 | 5 | 6 | 7 | 8 | 9 | 10 |
|---|---|---|---|---|---|---|---|---|---|
| Quantity | Stock | Price | Cost | Annualized Dividend | Option Calls | Strike Price | Premium Received | Annualized Fairly Secure Total | Possible Additional Total |
| 1,000 | AT&T | 45 7/16 | $ 45,477.50 | $ 1,320.00 | 11/21/97 | 45 | $ 2,048.00 | $ 14,386.82 | $ - |
| 1,000 | Allied Signal | 42 | $ 42,280.00 | $ 1,040.00 | 22/21/97 | 40 | $ 3,040.00 | $ 9,475.44 | $ - |
| 1,000 | ALCOA | 82 1/8 | $ 82,525.00 | $ 1,000.00 | 11/21/97 | 80 | $ 4,409.00 | $ 19,525.52 | $ - |
| 1,000 | AM Express | 86 | $ 86,407.00 | $ 900.00 | 22/21/97 | 85 | $ 2,482.00 | $ 12,920.00 | $ - |
| 1,000 | Boeing | 53 7/8 | $ 54,190.00 | $ 560.00 | 22/21/97 | 60 | $ 1,675.00 | $ 14,145.93 | $ 9,124.88 |
| 1,000 | Caterpillar | 57 13/16 | $ 57,812.50 | $ 1,000.00 | 11/21/97 | 60 | $ 1,427.00 | $ 12,574.40 | $ 17,738.75 |
| 1,000 | Chevron | 88 11/16 | $ 89,102.50 | $ 2,320.00 | 11/21/97 | 90 | $ 2,233.00 | $ 20,431.86 | $ 10,641.63 |
| 1,000 | Coca Cola | 63 7/8 | $ 64,220.00 | $ 560.00 | 11/21/97 | 65 | $ 1,986.00 | $ 16,668.45 | $ 9,124.87 |
| 1,000 | Disney | 85 3/16 | $ 85,592.50 | $ 530.00 | 11/21/97 | 85 | $ 3,165.00 | $ 24,684.56 | $ - |
| 1,000 | Du Pont | 61 1/2 | $ 61,835.00 | $ 1,260.00 | 11/21/97 | 60 | $ 3,413.00 | $ 16,776.34 | $ - |
| 1,000 | E. Kodak | 63 9/16 | $ 63,902.50 | $ 1,760.00 | 11/21/97 | 65 | $ 1,799.00 | $ 16,351.69 | $ 11,655.50 |
| 1,000 | Exxon | 66 13/16 | $ 67,167.50 | $ 1,640.00 | 11/21/97 | 65 | $ 3,165.00 | $ 12,614.18 | $ - |
| 1,000 | General Electric | 72 | $ 72,380.00 | $ 1,040.00 | 11/21/97 | 70 | $ 4,034.00 | $ 17,537.74 | $ - |
| 1,000 | General Motors | 68 7/16 | $ 68,792.50 | $ 2,000.00 | 11/21/97 | 70 | $ 1,923.00 | $ 17,597.45 | $ 12,669.38 |
| 1,000 | GoodYear | 69 3/4 | $ 70,110.00 | $ 1,120.00 | 11/21/97 | 70 | $ 2,544.00 | $ 21,754.38 | $ - |
| 1,000 | Hewlett Packard | 70 11/16 | $ 71,047.50 | $ 560.00 | 11/21/97 | 70 | $ 4,158.00 | $ 22,658.34 | $ - |
| 1,000 | I.B.M. | 106 3/4 | $ 107,215.00 | $ 800.00 | 11/21/97 | 105 | $ 6,769.00 | $ 41,509.11 | $ - |
| 1,000 | Int'l Paper | 55 3/4 | $ 56,070.00 | $ 1,000.00 | 11/21/97 | 55 | $ 3,910.00 | $ 26,630.76 | $ - |
| 1,000 | Johnson & Johnson | 61 1/2 | $ 61,835.00 | $ 880.00 | 11/21/97 | 60 | $ 3,041.00 | $ 13,379.05 | $ - |
| 1,000 | McDonalds | 47 1/2 | $ 47,795.00 | $ 330.00 | 11/21/97 | 45 | $ 3,414.00 | $ 7,743.00 | $ - |
| 1,000 | Merck | 102 7/16 | $ 102,887.50 | $ 1,800.00 | 11/21/97 | 100 | $ 5,889.00 | $ 29,799.17 | $ 9,124.87 |
| 1,000 | M.M.M. | 98 7/8 | $ 99,320.00 | $ 2,120.00 | 11/21/97 | 100 | $ 2,916.00 | $ 25,771.68 | $ - |
| 1,000 | Morgan, J.P. | 120 3/8 | $ 120,880.00 | $ 3,520.00 | 11/21/97 | 120 | $ 4,779.00 | $ 39,240.84 | $ - |
| 1,000 | Phillip Morris | 42 1/2 | $ 42,780.00 | $ 1,600.00 | 11/21/97 | 42 1/2 | $ 3,414.00 | $ 29,290.00 | $ - |
| 1,000 | Proct. & Gamble | 73 7/8 | $ 74,245.00 | $ 2,020.00 | 11/21/97 | 75 | $ 2,357.00 | $ 26,137.63 | $ 9,124.87 |
| 1,000 | Sears | 55 13/16 | $ 55,695.00 | $ 920.00 | 11/21/97 | 55 | $ 2,792.00 | $ 16,979.78 | $ - |
| 1,000 | Travelers | 75 3/8 | $ 75,750 | $ 600.00 | 11/21/97 | 75 | $ 3,413.00 | $ 25,241.22 | $ - |
| 1,000 | Union Carbide | 47 5/8 | $ 47,920.00 | $ 750.00 | 11/21/97 | 45 | $ 3,664.00 | $ 9,177.33 | $ - |
| 1,000 | United Tech | 78 1/2 | $ 78,885.00 | $ 1,240.00 | 11/21/97 | 80 | $ 2,296.00 | $ 19,862.86 | $ 12,166.50 |
| 1,000 | Wal Mart | 36 11/16 | $ 36,952.50 | $ 270.00 | 11/21/97 | 35 | $ 2,544.00 | $ 7,221.13 | $ - |
| | | | $ 2,091,072.00 | $ 36,460.00 | | 2072 1/2 | $ 94,699.00 | $ 588,086.66 | $ 101,371.25 |

TABLE 2

FIG. 8

AUTOMATED PORTFOLIO MANAGEMENT SYSTEM WITH INTERNET DATAFEED

BACKGROUND OF THE INVENTION

Field of the Invention

This invention relates to financial business systems, and in particular, to automated data processing systems and methods which have Internet data feeds, and which automate the evaluation, purchase, and sale of stocks and options, and which guarantee a growth in the value of the portfolio, regardless of whether the value of the stocks go up or down in the market place.

The commonly held belief of investors in stocks is that if a stock has a possibility for a high rate of return, then there will necessarily be a high risk associated with that stock. Conversely, an investment which has a low risk is considered to be necessarily a stock with a low rate of return. Investing programs are set up with this maxim in mind, and attempt to minimize the risk while maximizing the rate of return. There is no portfolio management program which is designed to deliver a high rate of return with low risk, and there is no portfolio management program which is designed to deliver a guaranteed high rate of return with no risk. Other programs and methods of investment also are linked to movement and timing of the market. If the market goes up, or stock is purchased or sold at the wrong time, the programs or methods have a high yield or a low yield or loss. Other programs and methods are also based on a manual evaluation of stock information, which can be supplied on paper or by an Internet source. They do not provide for an Internet data feed of stock and option into an automated system for evaluation and management of a portfolio.

It is, therefore, an object of this invention to provide an automated portfolio management system which has an Internet data feed containing information on stocks and options, in which the data populates a database, on which further calculations are performed and from which one or more portfolios are managed. It is a further object of the invention to provide an automated portfolio management system which has a high assured yield, and yet which is an ultra conservative investment program; that is, there is no or much reduced possibility of loss.

It is a further object of the invention to provide an assured yield, regardless of the market direction. It is a further object of the invention for the investment program to be affected by changes in interest rates by only a small degree. It is also an object of the invention to provide an investment program in which market timing is not a significant factor. An additional object of the invention is to provide an investment management system which provides a mechanism for double compounding or leveraging of investments. It is an object of the invention to provide a system which is ideally suited to assure preservation of already earned gains, with a high assured yield, and no possibility for loss.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects are accomplished by a financial management program and method whose parameters guarantee an assured high yield and mathematically eliminate the possibility of loss due to falling of prices of stocks on the stock market.

The invention is an automated system or method of managing an investment portfolio, in which information on companies, stock, and options are fed into and populate a database from a data feed from the Internet. The investment portfolio contains shares of stock which are purchased at various stock prices, and also various stock options. The portfolio is managed by an automated manager which is basically a database, with a conventional user interface for evaluating stock and option positions, for summarizing data, and for reporting data. The system or method is linked by a data link to current stock information from the Internet, a network, or other sources. The goals for a particular portfolio are decided upon, and a stock index is selected which contains various stocks, with each stock making up a certain percentage of the index, thus forming a ratio. The ratios of the stock in the index are utilized to create a representative grouping of stocks in the portfolio and thereby to mirror the selected stock index.

The next step of the method or system involves purchasing stock which is listed on the chosen index to form an investment portfolio which is representative of the index. One aspect of this invention involves purchasing every stock on the selected index, in a ratio identical to the ratio of the stock to the index.

Another aspect of the automated management system or method is an automated method which is based on a portfolio with stocks representative of the selected index, but not every stock in the index. An index is selected so that stocks which are representative of the index may be purchased. The next step of the method for the second aspect of the invention involves generating a performance comparison of a number of stocks from the index using a means of selection. This means of selection utilizes a set of criteria for selecting stocks for possible purchase, and evaluates these selected stocks against the performance of other stocks, including stocks which are already included in the investment portfolio. Stocks which meet the required parameters are segregated into List 1 for eventual purchase. Stocks which are currently in the portfolio but no longer meet the required parameters are placed in List 2, for eventual sale. Stocks which meet the required parameters for selection in all categories and are considered to be overpriced or more desirable at a lower price are also selected and placed on List 3. Naked puts are sold on these List 3 companies, since they would be desirable to include in the investment portfolio if at the lower base price. In both aspects of the system or method of the invention, stocks which are purchased for the investment portfolio have covered calls written against them for which a premium is received. Premiums from selling the covered calls and the naked puts are used to purchase additional stocks on which additional covered calls are also sold.

The market is evaluated for the need for insurance against the market going down. If insurance is needed, the at-risk value of the portfolio is determined using a formula. From the at-risk value, the amount of insurance needed to protect the at-risk value is also calculated, using a separate formula. A maximum amount which can be borrowed against the stock portfolio is also calculated, and this amount is used to purchase additional stock on margin. Covered calls are sold on the additional stock which is purchased, on margin, and the new at-risk value of the portfolio and level of insurance are recalculated.

Based on the amount of insurance which has been calculated to be needed, long term index puts are purchased with a strike price and in an amount such that if the market value of the portfolio stock goes down, the value of these puts will increase to an amount which is equal to or greater than the at-risk value of the portfolio.

The at-risk value of the portfolio thus purchased is protected by the purchase of index put options in an amount equal to or greater than the at-risk value of the portfolio. This is different than other portfolio management systems in that money which is set aside by these other systems need not be kept in reserve in the system and method of the invention. Funds are kept in reserve in other systems so that if stock prices fall, additional stock can be purchased at the lower prices. In the system and method of this invention, when prices fall a percentage of the index puts can be sold to buy stocks at the lower prices, and also to purchase additional index puts as insurance. This complete investment of funds without reserve for buying stocks allows maximum yields, yet assures against a drop in the market.

For the second aspect of the invention, one of the parameters used in selecting a stock is a relevance factor. The relevance factor is an index weighting factor which is used to determine each stock's price percentage in relation to that index divided by a safety factor plus a timeliness factor divided. The relevance factor is used with an analysis of annualized yield for each stock and each option position for each stock, to sort the stocks of the index. At regular periods, preferably daily, the annualized yield of each option is calculated, as well as the stepped-up and rolled-out positions on each option. The automated system then allows either manual or automatic selection of which position for each option results in the highest annualized yield. The system or method also periodically calculates a time value for each option in the portfolio and a cumulative time value of the entire portfolio. The system or method also periodically performs a new performance comparison of the stocks currently in the portfolio, and generates a new List 1, 2 and 3.

The automated system or method of the invention also displays a continuous readout of portfolio parameters. As stocks are designated to be sold or bought, and as options are designated to be sold, bought, rolled out or stepped up, these changes in the portfolio are used to perform continual recalculations and display of portfolio parameters.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

BRIEF DESCRIPTION OF THE DRAWINGS

FIG. 5 depicts a computer screen showing a readout of system parameters.

FIG. 6 depicts a computer screen showing menu selections.

FIG. 7 is a first table, Table 1, which is a portfolio which exemplifies the second preferred embodiment.

FIG. 8 is a second table, Table 2, which is a portfolio which exemplifies the first preferred embodiment.

DESCRIPTION OF THE PREFERRED EMBODIMENTS

Figure 1A:
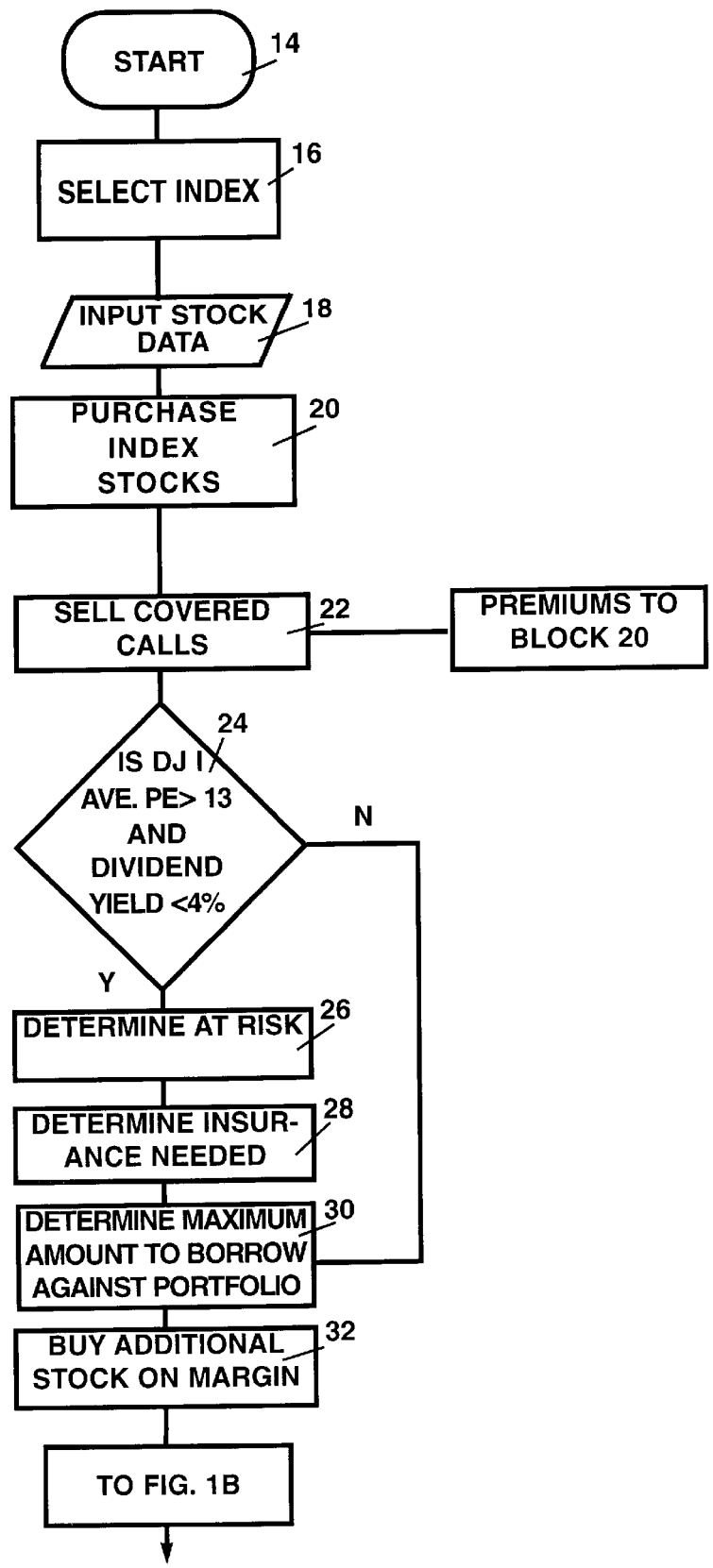
FIGS. 1A and 1B depict an overview of a first aspect of the portfolio management system or method.

A preferred embodiment of the present invention is directed to an automated method of managing an investment portfolio which contains shares of stock, and the data processing system for managing such an investment portfolio. This method of management of an investment portfolio and the data processing system for managing an investment portfolio is different than other portfolio management systems, in that a mechanism is utilized which guarantees the at-risk value of the portfolio against loss if the market prices of the stocks in the portfolio go down in value. The system or method also is designed for a double leveraging on funds. It also utilizes a data feed from the Internet or other telecommunication source to populate a database, where calculations are performed, and information is presented to the operator of the system.

Much of this system of managing an investment portfolio involves the buying and selling of options, so some definitions are presented for clarity of later terminology. Unless otherwise specified, the options discussed here are options to purchase or sell stock, rather than other options, such as index options, foreign currency options, or interest rate options. There are two types of stock options involved. One is called a "call", which gives the buyer of it the right but not the obligation to buy a particular stock at a given price up to a given time. The other type of option is a "put", which gives the purchaser of it the right but not the obligation to sell a stock at a certain price (the strike price) up to a given time. One can either buy or sell a "call", and one can either buy or sell a "put". Options are sold in contracts with one hundred shares per contract. Options expire after a preset period of time (the strike date), which can be one to three months, or longer. Long-term equity anticipation securities (LEAPS) are options which expire after a much longer period of time, such as a year.

When a person buys a call, he is hoping the underlying security goes up. By buying a call at a certain price, he has reserved the right to purchase that stock at that price for the prescribed period of time. The end of the period of time is called a strike date, and the price at which he may purchase the stock at is the strike price. If the stock goes higher than the strike price, he can buy the stock at the strike price and sell it at the market price for a profit. At that time, the value of the option itself has also increased, and he can sell the option, rather than buying and then selling the stock.

Selling a call is the opposite of buying a call. By selling a call, a person promises to sell stock at a certain price, the strike price, at any time until a certain date, the strike date. By selling a call, the seller receives money from the buyer of the option, and will have to sell his stock at the strike price at any time before the strike date when the buyer wants to buy it. If the value of the stock is lower than the strike price, the buyer of the call will not want the stock and will not buy it. If the price of the stock goes above the strike price, the buyer of the call may exercise his option and buy the stocks at the strike price, and either sell the stock at the higher market price or keep the stock, at his choice.

A person can sell naked calls, or can sell covered calls. Selling naked calls is the promise to sell stock at the strike price on or before the strike date, when you don't actually own this stock. Selling covered calls is the same, except that you own the stock for which the calls are sold.

When a person sells a put option, or simply a "put", he promises to buy a stock (have it put to him) at the strike price on or before a strike date. If the stock goes below the strike price, he may be forced to buy the stock at the strike price. If the stock then goes up, he can sell the stock at its higher price. If the market price stays below the strike price, he will have to buy the stock or buy back the option.

If a person buys a put, he has purchased the right to sell the stock (put it) to someone at the strike price on or before the strike date. If the value of the stock at that time is below the strike price, the buyer of the put can force someone to buy the stock at the strike price. As in the call option, stock can change hands in this manner, or the put option itself can be sold, if its value has gone up in the process.

If an option has been bought or sold, and is repurchased and resold with a later strike date, this is called rolling out, and the option is rolled out. If these options are repurchased and resold at a higher strike price, this is called stepping up, and the option is stepped up.

Figure 1B:
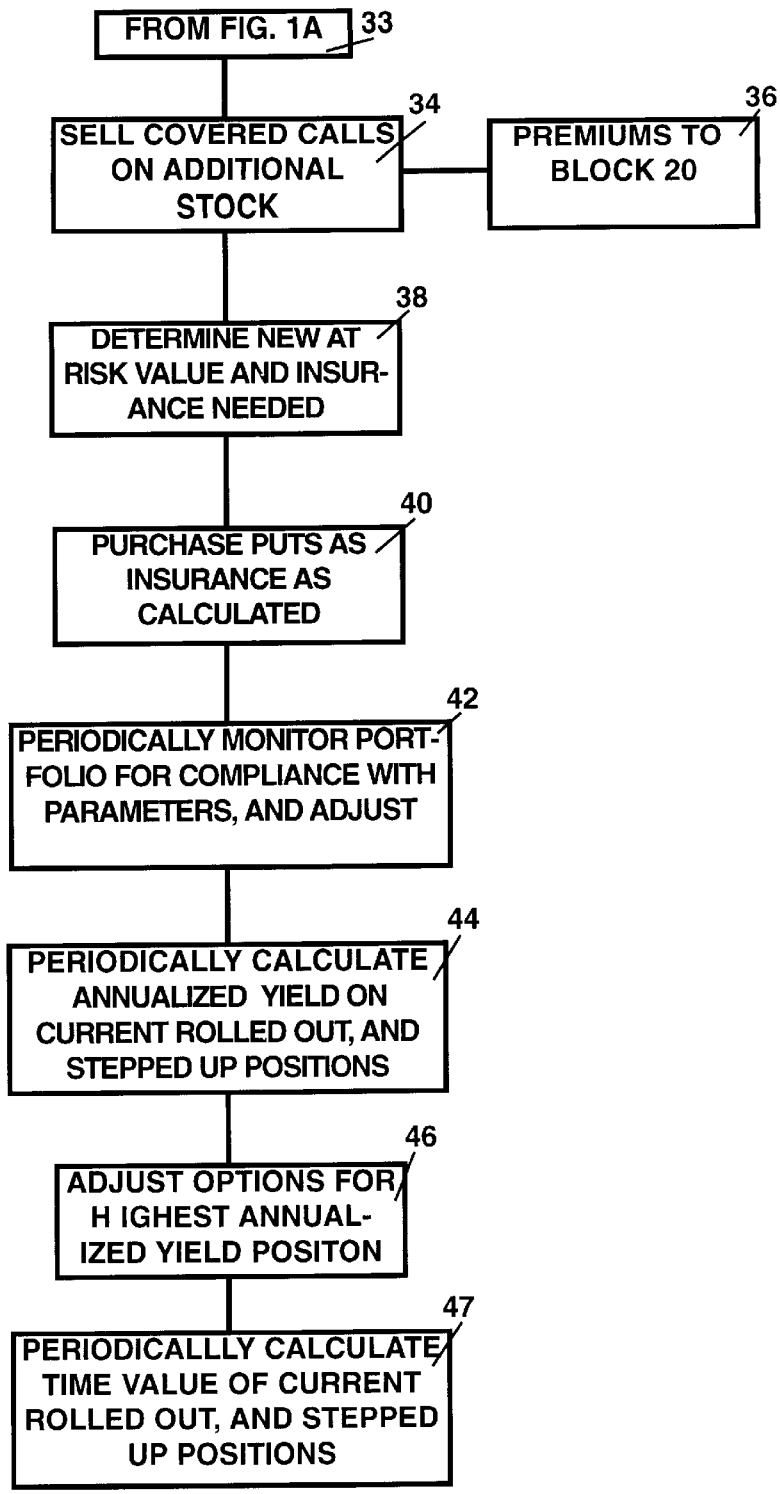

FIGS. 1A and 1B show an overview of a first preferred embodiment of the method of managing an investment portfolio and the data processing system for managing an investment portfolio. The system begins at block 14, and proceeds to block 16, at which point an index is selected. Various stock indexes can be utilized, depending upon the goals and preference of the system manager, such as the Standard & Poor's 500 (S&P500), the Standard & Poor's 100 (S&P100), or other stock indexes. After the stock index is selected, data on the stocks of the selected index are input into the system at block 18. The preferred method of inputting this data is by a data feed from the Internet, but other telecommunications or memory storage data sources could be utilized, such as by compact disk, computer diskette, e mail file transfer, or modem link to another computer system. The Internet is a network connecting many computer all over the world, through phone lines and connection hubs (servers) which coordinate the transfer of data from one computer to another. Some computers on the Internet have stock and investment data, and information from a number of these computers are accessed to feed data into the database of the invention, thereby populating the database. Data from other types of computer networks could also be utilized.

The data input includes but is not limited to a safety factor, a timeliness factor, a weighting factor of each stock in each index, a beta factor, commission information, PE, earnings history, and other information. In this embodiment of the invention, the next step involves purchasing all the stocks of the selected stock index, at block 20, at the ratio of each stock relative to the index. At block 22, covered call options (covered calls) are sold on all of the stocks purchased. At block 24, a yes or no decision is made. If the Dow Jones Industrial Average (DJIA) price-earnings ratio (PE) is greater than 13 and DJIA dividend yield is less than 4.00% then market conditions are such that insurance against a downturn in the market is necessary. If the above condition is met, then an at risk value of the portfolio is determined at block 26. From this, an amount of insurance needed to protect the at risk value of the portfolio is calculated. Varying degrees of protection of the portfolio can also be chosen as a system parameter, from 100% protection to 0% protection.

The at-risk value of the stock portfolio is found by adding the purchase price of each stock, plus the commissions for their purchase after deducting the premiums for all options.

As an example, if the purchase price of stocks in the portfolio plus commission is $990,000, and the premiums paid on them are $200,000, the at risk value would be $790,000.

After determining the at-risk value of the portfolio, the amount of insurance which is needed is also calculated at block 28. The means of determining an amount of insurance, in the form of index puts, to be purchased, and the strike price for those puts, is performed by the use of the following formulas:

1. $AMV(1.00+SC)$=preferred strike price of index puts

2. $(A-P)(1.00+S)$=how much insurance to buy

The terms of these formula are defined as follows:

A equals the total value of all equities valued at a strike price;

AMV equals the current value of the chosen index;

S equals a first safety factor to cover a price increase of a limited number of stocks inconsistent with or faster than a stock index; and SC equals a second safety factor to cover a price decrease of a limited number of stocks inconsistent with or occurring more rapidly than said stock index;

P equals the amount of all premiums received.

For example, if the chosen index is the Dow Jones Industrial, and the at the money value of the DJI is 8000, and the second safety factor (SC) is selected to be 5%, then:

8400 (1.00+0.05)=8400, and index puts with a strike price of 8400 should be purchased.

If the value of the equities (A) is $980,000, the value of the premiums (P) equals $200,000, and the first safety factor (S) equals 5%, then:

(980,000−200,000)(1.00+0.05)=819,000, the amount of insurance to be purchased.

The value from the formula above is used to arrive at the value of puts to purchase in order to protect the value of the portfolio.

However, if the condition in block 24 is not met, then insurance against a downturn in the market is not needed. If insurance is not needed, the system proceeds to block 30 to determine a maximum amount to borrow against the portfolio and use to purchase additional stock on margin at block 32. The maximum amount to borrow against the portfolio at block 30 is determined by the formula:

$$(E-S)(1.00-D)(0.5)+(0.90G)-I$$

In this formula, E equals the value of stocks in the portfolio, also called the long market value of the portfolio less U.S. Government securities. S equals the value of options in the portfolio, also called the short market value. D equals the percent of market theoretical drop possible under extreme conditions expressed as a decimal. This number is to be used as a parameter for the portfolio risk safety. G equals the total value of U.S. Government Securities which may be in the portfolio. I equals the value of the index puts purchased to protect the portfolio.

As an example, if the value of stocks in the portfolio (E) equals $1,000,000, there are no government securities (G) in the portfolio, the value of options in the portfolio (S) equals $200,000, a value of D is chosen of 25%, and the value of the index puts (I) purchased to protect the portfolio is $80,000, the calculation for a maximum to be borrowed would be:

$$(100,000 - 200,000)(1.00 - .25)(.5) + (.90 * 0) - 80,000 = 800,000 * .75 * .5 - 80,000$$
$$= 600,000 * .5 - 80,000$$
$$= 300,000 - 80,000$$
$$= 280,000$$

Additional stock on margin is purchased at block 32 of FIG. 1A. At block 34 of FIG. 1B, covered calls are sold on this additional stock. At block 36, the premiums from these covered calls are routed to cell 20 for the purchase of more index stocks. At cell 38, a new at-risk value and value of insurance needed, if any is needed, is recalculated. If the market conditions indicate that insurance against downturn of the market is needed, as calculated in block 24, index put options are purchased at block 40. These are purchased in an amount specified by the calculation of the insurance formula above. The cheapest index put would be purchased for insurance purposes, which would probably be a put with the longest strike date. Determining the cheapest index put would be done by evaluating the annualized cost for each possible index put. The purpose of these puts is so that if the value of the portfolio stocks goes down because of a decrease in the market price, the value of the purchased puts will inevitably go up. Two portfolios of approximately $800,000.00 and $600,000.00 of net value were managed under a version of this system in 1997. In October, 1997, the stock market went down to a degree which was exceptional, and Oct. 27, 1997, became known as "Black Monday". During this market dip, the portfolios managed by the method of this invention utilized puts as insurance, as described above. The portfolios were not affected by the dip in the market and, in fact, made money during that period of time.

The system and method also involve periodically monitoring the portfolio for compliance with parameters and making adjustments accordingly. This is shown in block 42 of FIG. 1B. The preferred method of monitoring is on-screen monitoring, which is continuous and on-going. Monitoring of system parameters can also be accomplished periodically, such as every hour, or daily. FIG. 5 is an example of a continual or periodic parameter check, which would appear on a computer screen to the system or method user. The parameter window is shown on the right, and lists parameter calculations of the current state of the portfolio next to the percentage goal for that particular parameter. When one of the parameters is too far away from the goal, the operator of the system would be notified by some method, such as a change in color to red, a flashing signal, or as shown in FIG. 5, an alarm light icon to the right of the percentage goal, which would turn red or flash red to indicate to the user that there was a problem with that particular parameter.

At block 44 of FIG. 1B, the system would periodically calculate the annualized yield on current, rolled out and stepped-up option positions. To accomplish this, each option in the portfolio would be listed in a row, with the time value for the current position in a column, with options with a later strike date (rolled out) and higher strike prices (stepped up) listed in other rows. The annualized yield for portfolio options could thus be easily compared with rolled out or stepped up positions, and a selection made to choose the option position with the highest annualized yield.

Annualized yield for option positions is calculated by the following formula:

$$\left(\frac{D + (P - C)}{PP - (P - C)}\right)\left(\frac{365}{d}\right)$$

The terms of this formula are defined as follows:

D=the dividends received for the stock
P=the premium received
C=the commission paid for the option
PP=the purchase price of the stock
d=the number of days until the strike date For instance, for an option which has a dividend of 1, a premium for the option of 5, a commission for purchasing the option of 1, and a price of the stock when purchased of 50, and a strike date 180 days from the current date, the annualized yield is calculated as follows:

$$\left(\frac{1 + (5 - 1)}{50 - (5 - 1)}\right)\left(\frac{365}{180}\right) = .1087 * 2.02777$$
$$= .2204$$

For an annualized yield of 22.04%.

Annualized yields for each option position and for rolled out and stepped-up positions are calculated and displayed to the operator. In block 46, FIG. 1B, the operator selects the option position which results in the highest annualized yield. After going through all of the options of the portfolio and selecting the preferred position for each, an action list is saved and printed out which indicates which options are to be sold, purchased back and rolled out, or repurchased and stepped up.

Similarly, block 47 in FIG. 1B shows that the time value of each option is periodically calculated, as well as a time value of rolled out and stepped up positions. The remaining time value of each option is calculated using the following formula: Time value=the amount of the premium over and above the intrinsic value of the premium at that particular time. The intrinsic value is the value of the stock minus the strike price of the call. The remaining time value of each option is calculated, along with the time values of rolled out and stepped up positions, and presented on a screen or print-out for the user to review.

For example, if General Electric stock is selling at $51, and the premium on a January 1999 call is $50 is $10, then the intrinsic value of the option at:

(51−50)=$1

The time value is $10−$1=$9

If the market price of the GE stock went to $52 the next day, the intrinsic value would be:

$52−$50=$2 and the time value would be:

$10−$2=$8.

A summary of the parameters and operator rules for this first preferred embodiment of the invention are listed below and titled "Exhibit B."

EXHIBIT B

PARAMETERS FOR 100% PORTFOLIO GUARANTEE

1. The financial manager must purchase all of the stocks in the index that he wishes to use for insurance, in proportion to the weighting of each stock to the index.

2. He must sell call options on all of the stocks.

3. He cannot sell any put options, except to make a closing trade for put options that had been previously purchased for insurance.

4. The call options should be divided about equally between short term, medium term and long term, short term being 6 months or less, medium term between 6 months and one year, and long term over one year.

5. The percentage of stock purchased in each company must be equal to the weighted percentage that the company represents in determining the index price.

6. The financial manager cannot buy any option calls except to close a transaction (roll up or step out) where covered calls had been previously sold.

7. To determine which strike price to use when the price of the stock price is in between the lower and next higher strike price, use the lower strike price if the stock price is one-half or less than one-half way between the two strike prices and use the higher strike price if the stock price is over one-half way between the two prices.

8. The financial manager cannot sell any naked calls.

9. The financial manager shall purchase an amount of index put options in an amount to cover the at-risk value of the portfolio at the time when established, or at later times, plus an amount to cover two safety factors, as determined by a formula. The put options used for insurance should be the furthest out in time to provide the cheapest cost.

To protect against the possibility of a few stocks taking a big drop in price while the rest of the index stocks don't follow suit so the index price wouldn't drop, purchase insurance at a strike price which is some higher than what would be the "at the money" strike price for the portfolio and would be expressed as 100% of 1+SC where SC would be the percentage over 100%, expressed as a decimal, to be used as a safety contingency.

If one or more of the stocks increase in price which is greater than that of the index and these stocks have stabilized at a price that is at or above the next higher strike price, the old option should be repurchased and a new one sold at the next higher strike price. This will increase the portfolio yield, but it may then be necessary to increase the portfolio insurance to protect the base at-risk value of the portfolio against this contingency, purchase put options in an amount greater than the at-risk value of the portfolio, and would be expressed as 100% or 1+S expressed as a decimal.

The formulas to use to determine the amount of insurance to purchase to make sure the portfolio is 100% protected, and the strike price for the put options, shall be as follows:

1. $AMV(1.00+SC)$=preferred strike price of index puts

2. $(A-P)(1.00+S)$=how much insurance to buy

The terms of these formula are defined as follows:

A equals the total value of all equities valued at a strike price;

AMV equals the current value of the chosen index;

S equals a first safety factor to cover a price increase of a limited number of stocks inconsistent with or faster than a stock index; and SC equals a second safety factor to cover a price decrease of a limited number of stocks inconsistent with or occurring more rapidly than said stock index;

P equals the amount of all premiums received.

10. The computer program determines the best secure annualized yield on all stocks in the index, at various strike prices and at strike dates, if the option were to be exercised and not exercised, and whether a portfolio stock should be stepped up or rolled out at any particular time.

11. Long term index options are European style options, which have a December strike date and can be exercised at that date only while stock options could expire in December or long term in January, and can be exercised at any time up to the strike date. Since the long term index put options, which are used as insurance, expire one month before the long term stock options, it will be necessary to use the computer program, at the index option date, to determine if a 100% guaranteed yield can be obtained by purchasing one month more of index put options, or close out the entire portfolio and establish a new portfolio, or roll the entire portfolio out to a new strike date and which may also be stepped up or down.

12. The entire portfolio with all option and stock positions is tracked on the computer and displayed for comparison. The program updates the entire portfolio periodically (at least each day) by inputting new market values and dates, and recalculating the portfolio net worth, yield on each position, and time value of each position. It also displays the annualized yield of current and available option positions, indicates when an option position should be closed (sold) or a new stepped up or down position should be established, and allows the manager or operator to indicate which of the available option position to select. It also indicates what action to take at the index expiration date to give the best 100% guaranteed yield.

13. The computer program monitors the entire portfolio periodically (at least daily) to determine that the portfolio is in compliance with all the formulas and parameters required to keep the portfolio in compliance as a 100% guaranteed entity.

14. Any call option with a strike price lower than the current price of the underlying stock, or any call option near the strike date must be repurchased and a new option sold so that the stock will not be called away from the portfolio. The formula to determine the insurance needed must be used again at this time.

15. If the price of one or a few stocks has gone down below the strike price of the calls sold, at the expiration date, but the other stocks in the index keep the index price at or above the strike price of the puts purchased for insurance, less the safety factor, when the new calls are sold, they cannot be sold below the at-the-market price of the option and not lower than what would have been the next lower strike price below the cost of the stock when the portfolio was evaluated to determine the amount of insurance required to give 100% protection to the portfolio.

If the index price is below the strike price at the strike date of one or more stocks and the stock is 10% or more below its strike price, the stock should be sold and also only enough put contras that would equal the at-risk value of the stock or stocks at the time when the formula was used to determine the amount of insurance needed. After 31 days, the stock is to be repurchased and the amount of insurance needed to provide proper coverage re-determined. If the stock or stocks go down during the 31 days, the operator will repurchase the stock at a lower price, thus not hurting the portfolio value. If the stocks go up during the 31 days, the safety factors S and SC should protect the portfolio. It is necessary to sell an amount of index puts to lock in a profit on the puts to offset the loss on the stock.

16. If a stock is called, the same stock must be repurchased immediately and a new call sold. The computer program will indicate which strike date and strike price must be used to stay within the parameters and yet give the best yield, and the needed insurance for protection must be recalculated.

Figure 2A:
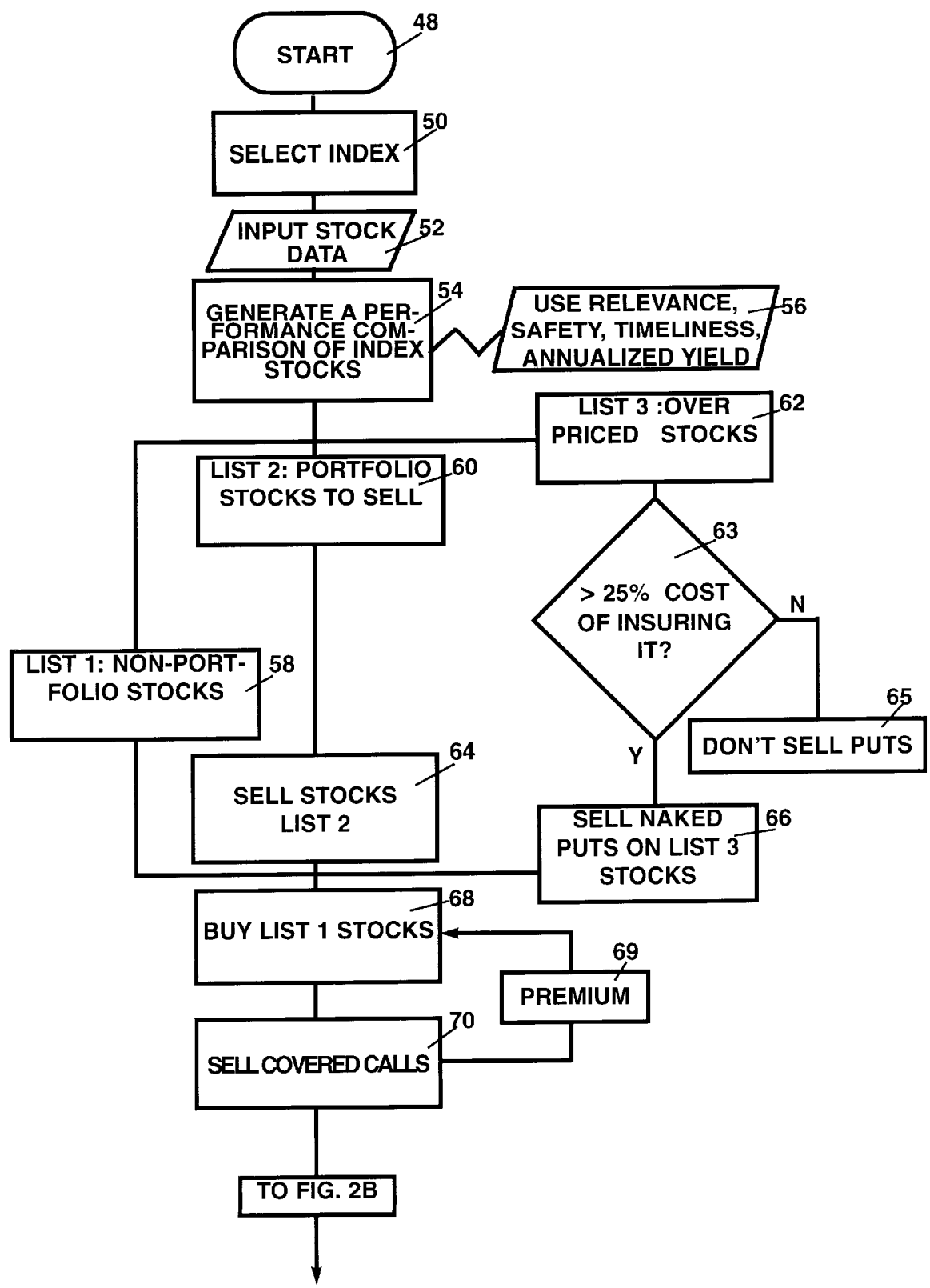
FIGS. 2A, 2B and 2C depict a second aspect of the portfolio management system or method.
Figure 2B:
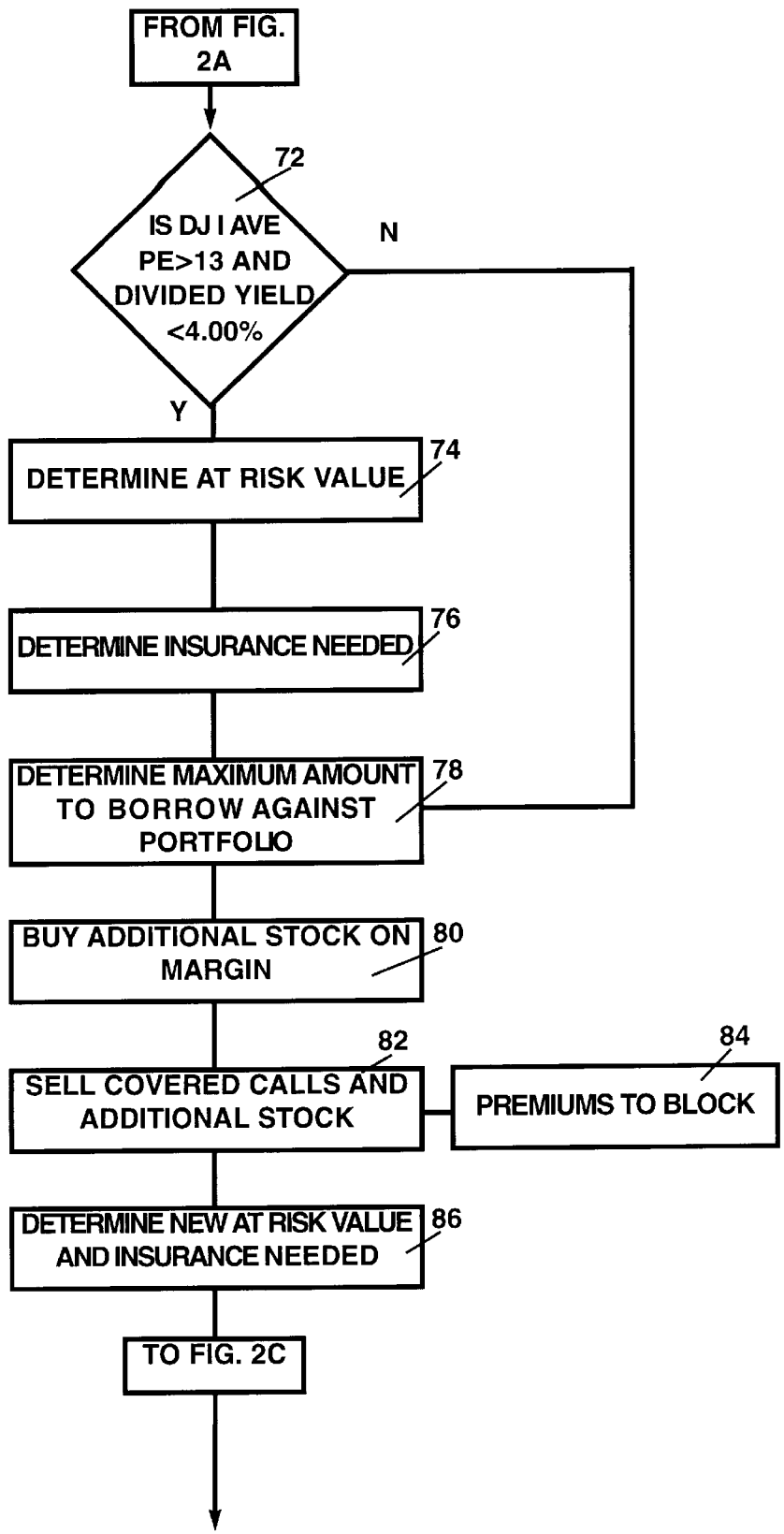
Figure 2C:
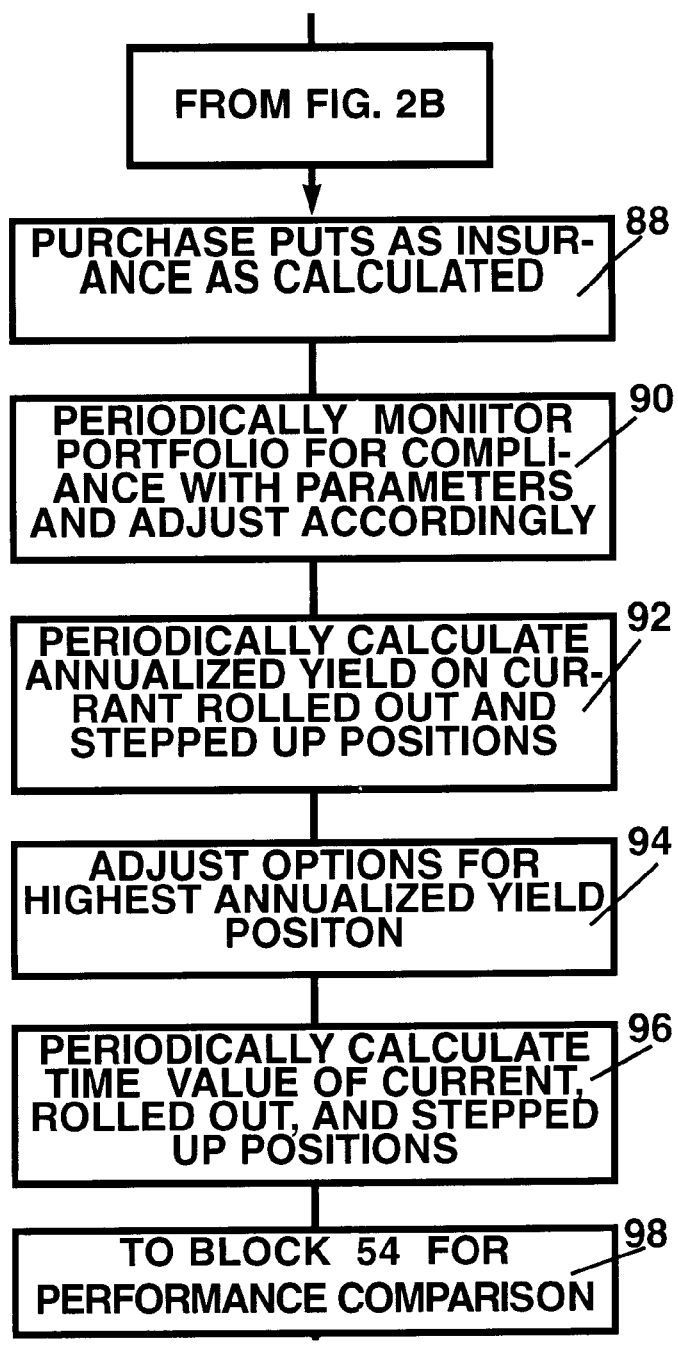

A second preferred embodiment of the invention is shown in FIGS. 2A, 2B and 2C. In the second preferred embodiment, stocks are purchased which are representative of the index, but each and every stock of the index are not purchased in representative ratios. Blocks 48, 50 and 52 of this system or method are identical to those of the first preferred embodiment. The part of this second preferred embodiment which is different than the first embodiment begins with a periodical reevaluation of performance of stocks at block 54 of FIG. 2A. If stocks are already purchased and are present in an investment portfolio, then the stocks in the portfolio are evaluated, as well as other stocks, such as stocks from Standard & Poor's 500 (S&P 500) or other index. This reevaluation would preferably take place every day, and would be based upon updated information about each stock and calculations which evaluate the performance of each stock. This performance evaluation step is shown as block 54 of FIG. 2A, using the previously discussed relevance, safety, timeliness, and annualized yield, as shown in Block 56.

Figure 4A:
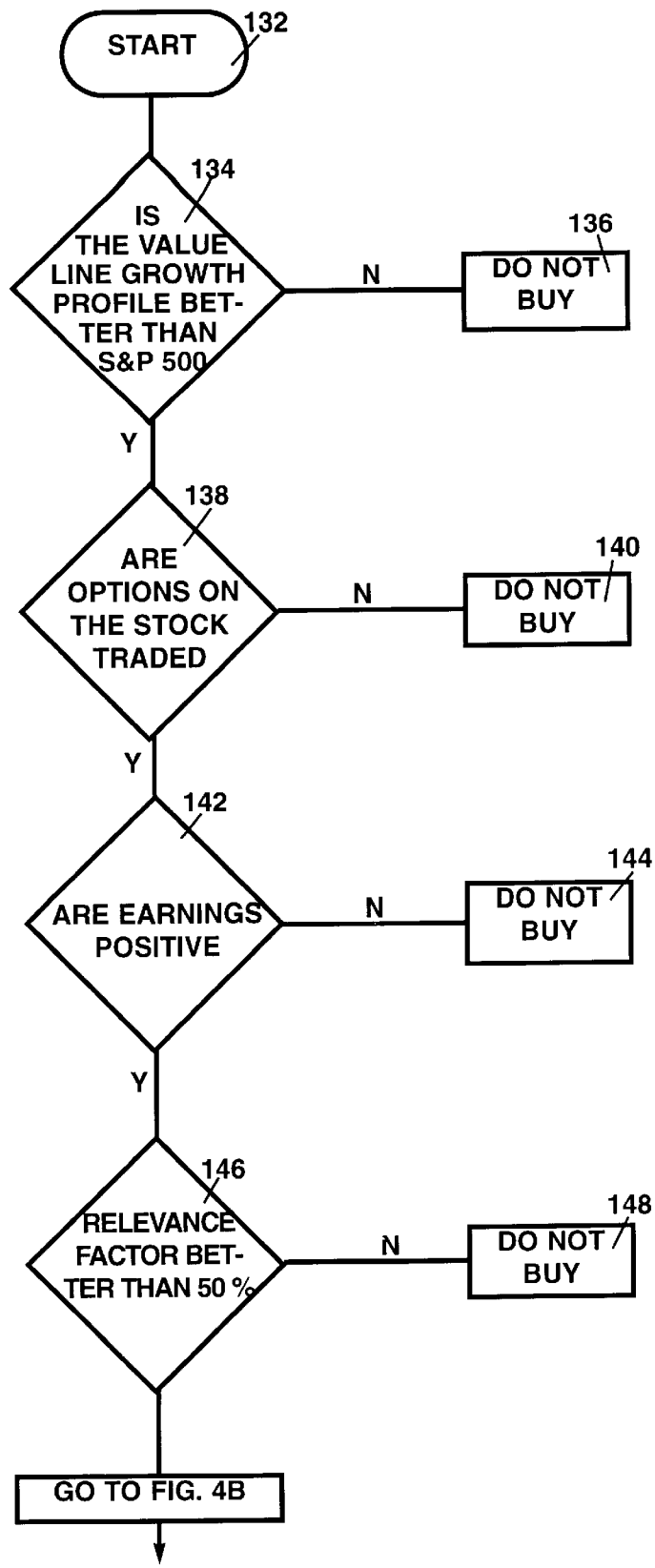
FIGS. 4A, 4B and 4C depict the logic charts of stock purchasing.
Figure 4B:
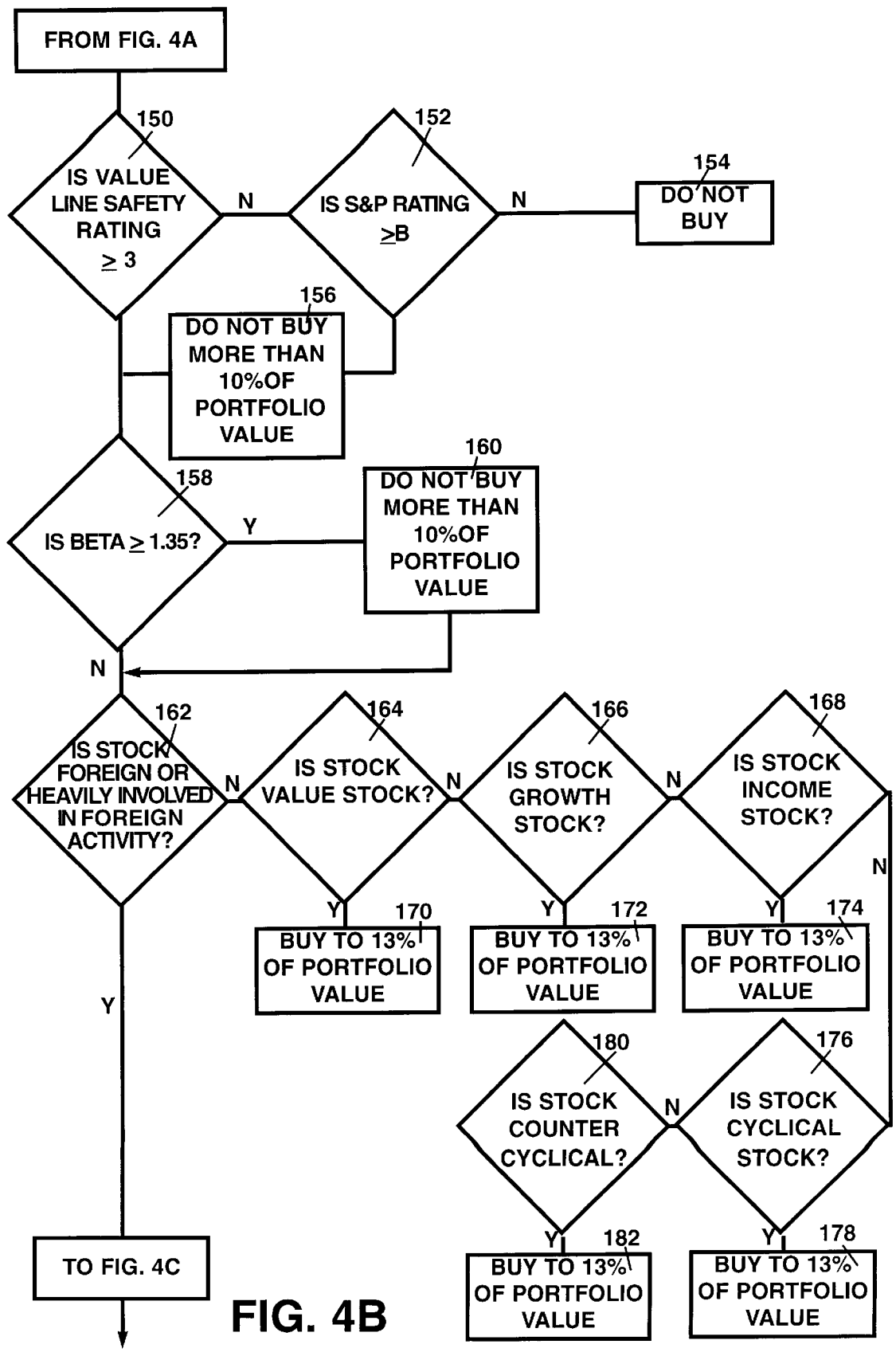
Figure 4C:
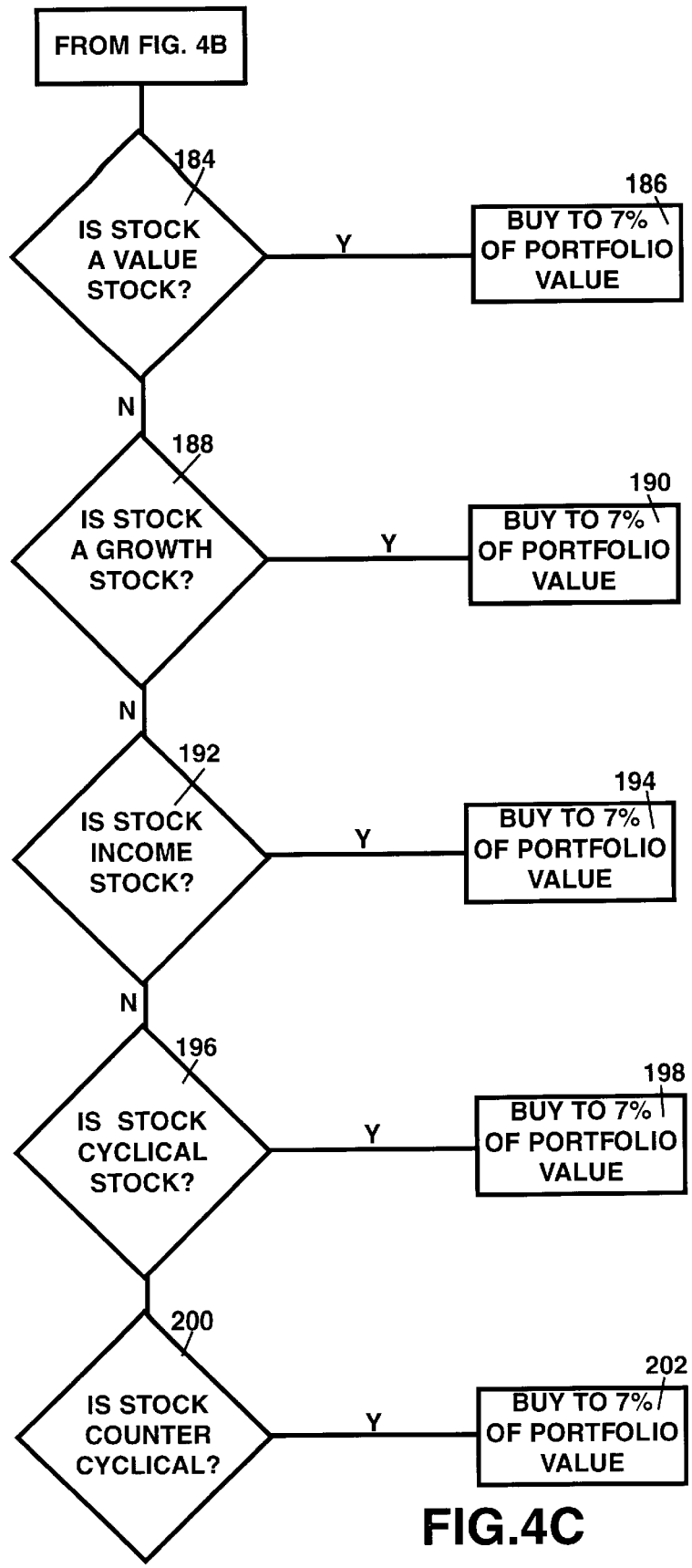

The performance comparison of block 54 uses the sequence of steps shown in FIGS. 4A–4C to eliminate certain stocks from consideration and to arrive at a pool of stocks which are arranged in three lists. The stock selection process depicted in FIGS. 4A–4C will be discussed later. In FIG. 2A, the three lists which result from the performance comparison are shown in List 1 at block 58, List 2 at block 60, and List 3 at block 62. List 1 contains stocks which are not presently in the stock portfolio, but which meet the selection criteria which are illustrated in FIGS. 4A–4C, and which would be desirable stocks to purchase. List 2 contains stocks which are presently in the investment portfolio, and which no longer meet the selection criteria, and which therefore should be sold. List 3 contains stocks which are considered to be good stocks, and which would be desirable to purchase, if at a lower price than their present value.

As shown in block 60 in FIG. 2A, the list 2 stocks are sold (block 64) with the proceeds going to block 68 for the purchase of additional stocks from list 1. Block 63 shows that list 3 puts are evaluated to determine if the additional cost to the portfolio of insuring the puts is greater than 25%. If the answer to that question is no, the decision is made at block 65 not to sell puts. If the answer to that questions is yes, then Naked puts are sold at block 66 on the stocks which are contained in List 3. The proceeds from the sales of naked puts are called premiums and go to block 68 for the purchase of additional stocks from List 1. Block 70 indicates that covered calls are sold for all of the stocks purchased at block 68. The premiums from these covered calls go to block 68 to purchase more stocks from List 1. The premium from selling covered calls at block 70, is shown at block 69 as being returned to the fund for buying stocks at block 68.

Blocks 70 through 98 of FIGS. 2A–2C are similar in operation to the corresponding blocks in FIGS. 1A and 1B. At block 72, conditions which are related to the need for insurance are evaluated, and if there is no need, operation goes to block 78 to determine the amount to borrow against the portfolio. If the conditions of block 72 are met, the at risk value is determined at block 74. At block 76 the amount of insurance and strike price of the index puts is calculated. At block 78, the maximum amount to borrow is calculated. At block 80, additional stock is purchased on margin. At block 82, covered calls are sold on the purchased stock, with the premiums going from block 84 to block 68 to purchase additional stock. A new at risk value and insurance needed is calculated in block 86. At block 88, long term index puts are purchased to serve as insurance. At block 90, the portfolio is periodically monitored to ensure that it complies with parameters, and adjustments are made accordingly. At block 92, the annualized yield on option positions is calculated, and the options position with the highest yield is chosen at block 94. At block 96, the time value of option positions are periodically calculated. At block 98, operation returns to block 54 for a periodic performance comparison based on newly input data from block 52, and the cycle begins again.

A number of criteria are used for selecting stock or eliminating certain stocks from consideration in order to arrive at the preferred or List 1 stocks for the second preferred embodiment of the invention. These steps are illustrated in FIGS. 4A through 4C. The selection process begins at block 132 of FIG. 4A. At block 134 only those stocks which have a ValueLine growth profile better than S&P 500 are passed on for further consideration. Those which do not meet this criteria are eliminated at block 136. At block 138 only those stocks on which options are traded are further considered. At block 140, those stocks which do not meet this criteria are eliminated. At block 142, only those stocks for which earnings are positive are further considered. At block 144, those whose earnings are not positive are eliminated. At block 146, the relevance factor is considered, and only those in the top fifty per-cent (50%) are considered further. Those which do not meet this criteria are eliminated in block 148. The relevance factor is calculated by assigning a factor of 1 to 6 to each stock for timeliness, and a similar factor for safety, 1 being the highest, and 6 being a company with no rating. Values such as these are assigned by ValueLine, and other companies supply similar numbers. The weighted percent factor of each stock in the index is then divided by the total of the timeliness and safety factors to arrive at a relevance factor. The relevance factor is combined with an annualized yield calculation of every stock and option considered for the portfolio, and those with both a high annualized yield and a high relevance factor are selected for further consideration at block 146.

If the ValueLine safety rating is greater than or equal to three at block 150, they are passed on to block 158 for further consideration. If the ValueLine rating is not greater than or equal to three, they are passed on to block 152 for evaluation. If the S&P rating of those stocks evaluated in block 152 is greater than or equal to B, they are passed on to block 156 which indicates that no more than ten per-cent of the portfolio value should be invested in stocks of this type. This condition is subsequently monitored. If the stocks evaluated in block 152 are not greater than or equal to a B S&P rating, they are passed to block 154 and are no longer considered.

At block 158, the stocks still under consideration are evaluated for a beta of less than or equal to 1.35. The beta is a measure of the volatility of a price of a stock compared to the market as a whole. A beta of 1.00 indicates that the stock price will likely fluctuate in proportion to the rise and fall of the market. A beta of less than 1.00 (0.70, for example) indicates that the stock is proportionally less subject to market fluctuation than the average. A beta of more than 1.00 (1.35, for example) shows that the stock is proportionally more subject to market fluctuation than the average.

After evaluating the beta of the remaining stock at block 158, the stocks which have a beta of less than 1.35 are further evaluated in block 162. Those with a beta of more than or equal to 1.35 go to block 160. At block 160 it is noted that no more than ten per-cent of the portfolio value be invested in stocks with a beta of greater than or equal to 1.35. This condition is subsequently monitored. From block 160, these stocks go to block 162 for further evaluation.

The stocks purchased for the portfolio are selected to be diversified, and to mirror the ratio of companies of the index. For instance, the Dow Jones Industrial contains 30 industrial stocks, the Dow Jones Transportation 20 stocks, and the Dow Jones Utility 15 stocks. A portfolio mirroring a Dow Jones Index would have similar ratios of industrial, transportation or utility stocks. In order to keep the portfolio diversified, stocks would also be rated as to whether they were domestic, foreign, or U.S. stocks with heavy involvement in foreign markets at block 162. One-third of a portfolio should be in stocks which have a high involvement in foreign markets, or are themselves foreign stocks.

Other factors which are to be used in generating a performance comparison of index stock include fundamentals, such as the company PE, timeliness rating, safety rating, cash flow per share, dividend yield, sales trend per share, earnings trend per share, earnings trend per year, average annual PE, (The PE ratio is found by dividing the current stock price by the past earnings per share), operating margin, net profit trend per year, per-cent earned on total capital, working capital and dividend pay-out rate.

Stocks in the portfolio are further classified as to their type, as a further means to ensure diversification. Stock type can include value, conservative, growth, cyclical, or other types. There are many techniques to determine which are the best value stocks, for instance, and any standard technique could be utilized with the system or method of the invention. For instance, the book *EVERYONE'S MONEY BOOK* by Jordan E. Goodman and Sonny Bloch, incorporated herein by reference, describes methods of evaluating stocks to determine if it is a good cyclical stock, a good growth stock, a good income stock, an out-of-favor stock, a value stock on pages 99 through 115.

The formulas for comparison of stock described therein are illustrative of traditional stock evaluation methods and any one of a number of traditional stock evaluation methods could be utilized to evaluate the fundamentals of stocks for these different categories. A portfolio can be maintained for different goals, and the relative percentages of the types of stock will vary according to the goals of the portfolio. An even weighting of the five types of stocks is shown, with a total of 66% being domestic and 33% involved in foreign activity. Other mixes would be established as parameters, to suit the goal of the particular portfolio.

At block 162, the remaining stock is evaluated for whether it is a foreign stock or is it a stock which is heavily involved in foreign activity, such as Boeing, General Electric, Merc, or others. If the stock is a foreign stock or is heavily involved in foreign stock, those stocks go to FIG. 184 on FIG. 4C. If it is not a foreign stock or heavily involved in foreign activity, then it goes from block 162 to block 164 on FIG. 4B. At block 164 the remaining stock is evaluated for whether it is a value stock at block 164, and subsequently if it is growth stock at block 166, an income stock at block 168, a cyclical stock at block 176, or a counter cyclical stock at block 180. If it is a value stock at block 164, thirteen per-cent of the portfolio value is invested in this category of stocks at block 170.(13% is based on 5 types of stock to total 66% (13×5) of the portfolio). If it is not a value stock, it goes to block 166 for evaluation of whether it is a growth stock. If it is a growth stock, it goes to block 172 where thirteen per-cent of the portfolio is invested in this stock. If it is not a growth stock, at block 166 it goes to block 168 where it is evaluated for whether or not it is an income stock. If it is an income stock, thirteen per-cent of the portfolio value is invested in this stock at block 174. At block 168, if it is not an income stock, it goes to block 176 for evaluation if it is a cyclical stock. If it is a cyclical stock, thirteen per-cent of the portfolio value is invested in this stock at block 178. If it is not a cyclical stock, it goes to block 180 for evaluation of whether the stock is counter cyclical. If it is counter cyclical, thirteen per-cent of the portfolio value is invested in these stocks at block 182. Other types of stock and percentages for the particular goals of a portfolio can be chosen according to the goals of the portfolio.

For the stocks which were evaluated in block 162 as being foreign or as being heavily involved in foreign activity, it is next evaluated in blocks 184 through blocks 202 in the same manner as the stocks were evaluated in block 164 through block 182. For each of the types of stocks, value, growth, income, cyclical and counter cyclical, seven per-cent of the portfolio value is invested in each of these five types of stock. This results in one-third of the portfolio being invested in foreign or stock heavily involved in foreign activity, and two-thirds of the portfolio being invested in non-foreign stocks.

These stocks should only be purchased if they have a timeliness and safety rating total by value line of not over five. However, if the stocks are rated three and three by value line, if they are also rated at a B– or better by Standard & Poor's, then up to ten per-cent of the value of the portfolio stocks can be invested in these stocks.

Figure 3:
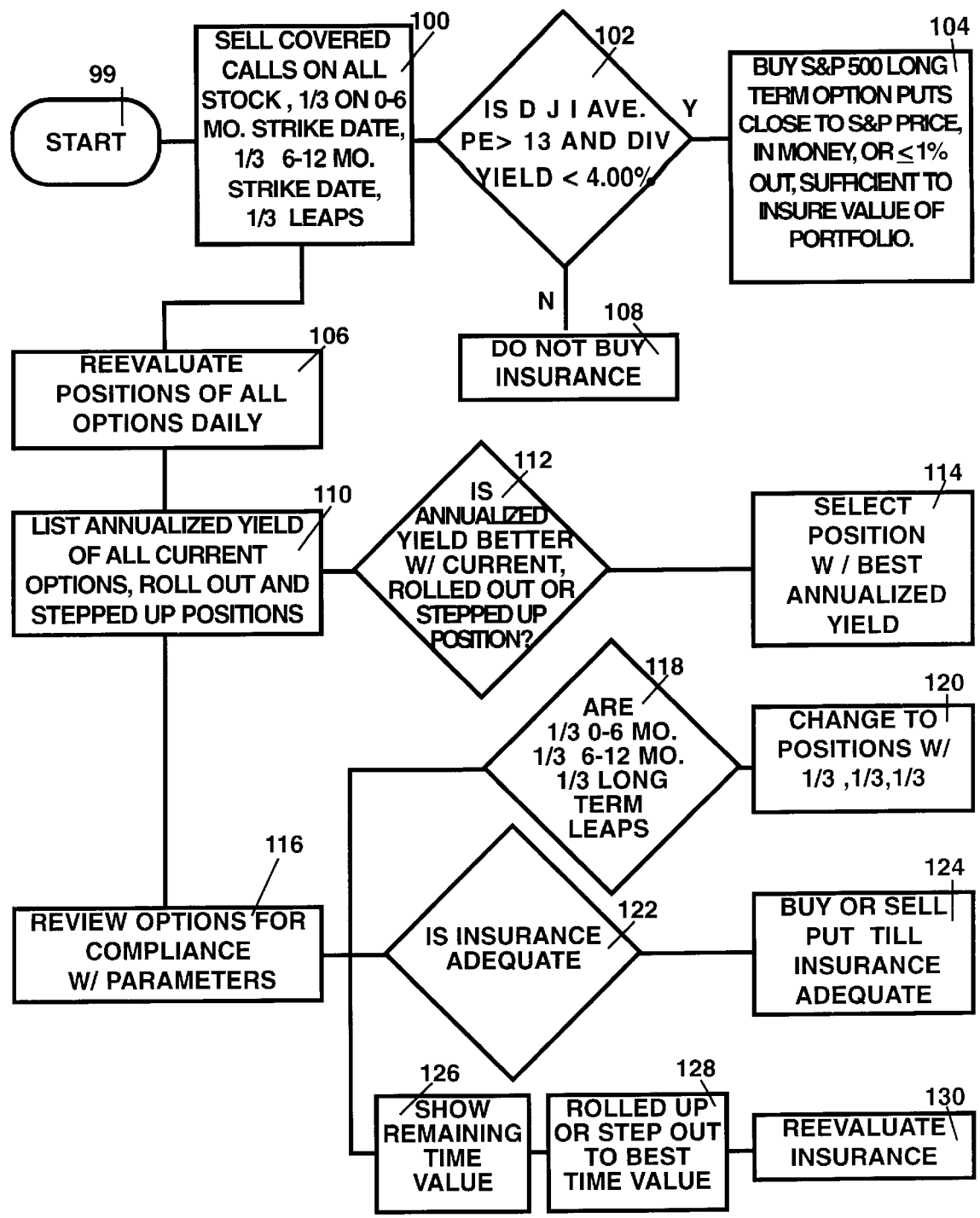
FIG. 3 depicts the logic chart of option management.

There are certain guidelines and parameters in managing the options of the portfolio. These are illustrated in FIG. 3 and begin at block 99. At block 100, covered calls are sold on all of the stocks in the portfolio. One-third of the calls have a strike date of less than or equal to six months. One-third of the calls have a strike date of between six and twelve months. One-third of the calls are long-term equity anticipation securities (LEAPS) and have a strike date of greater than twelve months. At block 102, the market is evaluated to see whether insurance is required on the portfolio. If the Dow Jones Industrial Average PE ratio is greater than 13 and the dividend yield is less than or equal to 4.0, then insurance is purchased at block 108. If the Dow Jones Industrial Average is greater than 13 and the dividend yield is less than 4.0, then long-term index put options are purchased at block 104. These put options are for S&P 500 options or any other index option, close to the index price, at the money or about one per-cent out of the money in a quantity sufficient to insure the value of the ratio. The formula for determining how much is sufficient to insure the value of the portfolio is shown in the example portfolio which follows.

At block 106, the positions of all options are reevaluated daily. This reevaluation includes a comparison of the current positions of all options with the stepped-up or rolled out positions of these options. As shown in Block 110, the annualized yield of all options are listed, including the rolled out and stepped up positions of each option. At block 112, a determination is made whether the annualized yield is better with the current position, or with rolled out or stepped up positions of that option. At block 114, the position is selected which has the best annualized yield. At block 116, the options are periodically, or preferably continually, reviewed for compliance with the parameters of the system. These parameters include those shown in block 118, which is one-third of the strike dates, less than or equal to six months, one-third of the strike dates, between six months and twelve months, and one-third of the strike dates as LEAPS, and greater than twelve months. At block 120, if the options are found to be outside the parameters of block 118, they are changed to be within the parameters. At block 122, the portfolio, including its options, are evaluated to see that insurance against downturns in the market is adequate. At block 124, index put options may be purchased or sold until the insurance on the portfolio is adequate. At block 126, the remaining time value of the options is shown. At block 128, the position is chosen which has the best time value. After these changes in the option composition of the portfolio, the adequacy and need for insurance is reevaluated at block 130.

A summary of the requirements of this second preferred portfolio is listed below and titled "Exhibit A."

EXHIBIT A

PARAMETERS FOR AN "ASSURED HIGH YIELD ENTITY"

1. Never deal in a stock that doesn't have options.
2. Never trade in stock with a negative earnings.
3. Never trade on rumors or tips unless strong fundamentals confirm it.
4. Never chase a stock or option unless there is a very strong fundamental reason to do so.
5. The portfolio should be based primarily on a long term future basis so never purchase based on market timing unless there is a very strong fundamental reason to do so.
6. Never sell naked calls unless it is to put a collar on a stock or there is a very strong fundamental reason for a down trend.
7. Never sell put options on a stock you wouldn't want to own at the new price if the stock was put to you.
8. Never put in an order to just buy or sell a stock or option. Always get the bid and ask prices and try to shave at least ⅛ to ¼. When placing a combined stock and option order, shave a least a quarter point and if there is a large spread, try to shave ⅜ point. Place the order in on all or none and good till canceled basis and leave for 3 or 4 days and then reconsider. The quotations are constantly changing, so about 90% of the time you will get a fill.
9. Whenever possible, use a combined order to purchase a stock and sell the options at a combined net figure to assure you know what your net costs and returns will be.
10. Purchase stocks in quantities of 1000 or more and trade in options of 10 or more contracts at a time to reduce commission costs and get a better trading response.
11. The best overall yield received is when the strike price used is the one closest to the price of the stock, so always use that one unless there is a good fundamental reason to use the next strike price higher or lower.
12. The annualized yield for the premium on contracts that are of a short time period and close to the strike price is always much greater than for a long time frame, so always have a few stocks with a one to three month time frame, but these are more volatile, so only ⅓ of the portfolio should be of a 6-month or less time frame.
13. Never invest in a stock that has a value line safety rating below 3 unless it has a S&P rating of B or better.
14. Invest only in value stocks that have a timeliness and safety rating total by value line of not over 5, however, you may invest up to 10% of the portfolio in stocks that value line rates 3—3, provides S&P rates that at a B− or better.
15. Invest only in stocks that are of good value and have a good fundamentals record.
16. Always carry a very diversified portfolio as to industries, expiration dates of options, U.S. and foreign involvement, and between value, growth and conservative stocks and should follow the following criteria;

a. Options should be divided about ⅓ short term (six months or less, ⅓ short term leaps, and ⅓ long term leaps).

b. Stocks should be divided so that at least ⅓ of the portfolio is in foreign companies or companies located in the U.S., but are very strong in foreign countries, such as Boeing, General Electric, Merck, etc.

c. Stocks should be diversified in industries, including some cyclical and some counter cyclical.

17. Consider the Beta of the companies in the portfolio and do not put more than 10% of the portfolio in companies with a high Beta, or it could throw the portfolio out of kilter with the index. Anything over 1.35 should be considered high Beta.
18. In a market that has a bullish sentiment, the premium on the calls will be higher and when it has a bearish sentiment, the premiums on the puts will be higher. This should be considered when doing the options.
19. The short term premiums of an option react quicker to changes in the market than long term premiums on the same stock and this must always be considered when deciding which time of option to use. If a stock is moving down, the premiums on a short term call will go down much faster than the long term premium. This must all be taken into consideration.
20. If you have sold puts on a stock and it is nearing the strike date and the stock may be put to you and the stock no longer meets your requirements, it is better to buy back the puts to close the transaction. If the stock is put to you, immediately sell calls on it to lower your base investment in the stock.
21. If you have sold call or put options on a company that no longer meets the required parameters, repurchase the option and sell the stock.
22. If a stock has gone up considerably and the fundamentals are still good at that price, you can repurchase the call and sell a new call at a higher strike price. This is called stepping up, or you can also roll it out to a later strike date. This way you can usually gain 25% to 35% of the price increase and keep your original premium and thus increase your yield.
23. When selling both a put and a call on a stock, you can get the best yield and safety when the stock price is at the strike price that you will use or very close to it, however, if the stock price is in the middle between two strike prices, it is better to sell the call at the lower strike price and the put at the higher strike price as that way you will get a much better premium and thereby lower your interest expense when you are on margin.
24. Never purchase naked puts, except to cover your portfolio and then only to the extent of the at-risk equities you have.
25. Index option puts should be used to protect the portfolio when the Dow Jones Industrial Average P.E. is above 13 times and the dividend yield is below 4%. Buy the puts at a strike price that is closest to the price of the index and in the money or not more than 1% out of the money, and buy the puts with the longest time out, as that is the cheapest protection in the long run. If the P.E. is below 13 times and the yield is above 4%, do not buy puts for insurance. You may purchase index puts on the Dow Jones, the S&P 100, or the S&P 500, or any combination, whichever produces the lowest annualized insurance cost may be used, as they all run pretty much parallel.

26. Freeze the at-risk value of the portfolio or put a collar on it by selling covered calls on the stock you own and also the naked puts and then purchase long term index puts in a sufficient amount to insure the at-risk value of the portfolio. The number of index put contracts needed is determined by adding up the call strike price of all the stocks for value and to that figure add the amount of the underlying value of all the puts sold, and this would give you the gross at-risk value of the portfolio. From that figure deduct the total amount of all call premiums received, as you have already received that money, and if the market goes down, the call options will expire worthless. This will give you the net at-risk value of the portfolio you must insure. Divide that amount by the index put value for one contract at the strike price you wish to use, and that will give you the number of contracts required to insure the portfolio. You have then put a collar on the at-risk value of the portfolio, because the calls sold put a ceiling on it and the puts purchased put a floor on it.

27. Maintain the portfolio stock as clearly representative to the index as possible.

28. the factors to consider to determine if a company has good fundamentals are: The company P.E., timeliness rating, safety rating, cash flow per share, dividend yield, sales trend per share, earnings trend per share, earnings trend per year, average annual P.E., operating margin, net profit trend per year, percentage earned on total capital, working capital and dividend pay out rate.

29. Since the portfolio is insured, the financial manager should borrow an amount almost up to the maximum allowed, providing consideration for the puts sold, and use it to purchase additional stock and sell more call options to maximize the yield on the portfolio—known as dealing on margin. The formulas to be used to determine the maximum of borrowing allowed shall be as follows:

$$[(E-S)+PV] \times 0.5 \times (1.00-D)+0.90G-I=\text{maximum amount of borrowing allowed where:}$$

E=long market value of portfolio less U.S. Govt. Securities
S=short market value of securities
D=percent of market theoretical drop possible under extreme conditions expressed as a decimal, to be used as a parameter for the portfolio risk safety.
G=total value of U.S. Government securities
I=Cost of insurance needed to protect the portfolio
PV=total underlying value of puts 30. You can use any conservative strategy, such as straddles, spreads, roll outs, stepping up or down, etc., that will increase the net growth of the portfolio, but will not sacrifice its safety.

31. If you are not buying all of the stocks in the index, buy only the stocks that have a better growth profile than the index. This will give you an advantage over the index, and greater safety, and a predictable performance.

32. Sell some calls that have a strike price a little over the stock price, and naked puts, so that the total of the possible additional gains on the call options and the premium on the puts, on an annualized basis is sufficient to pay the cost of purchasing the index puts, on an annualized basis, which you purchase for insurance. This may decrease your yield slightly if the market stays flat, but will increase your yield if the market goes up and you will still have your insurance if the market goes down.

33. Be sure that you have sold calls or puts or a combination of both on all stocks in the portfolio at all times, but never deal in any futures.

34. The system uses a computer to rank the relevance of all stocks considered as to timeliness, safety, and its weighted percentage of its share of that index's price. Accomplish this by assigning a factor number of 1 to 6 for each of timeliness and safety—one being the highest and six for a company with no rating. You may use the values assigned by Value Line if you are a subscriber, or a similar system. Divide the weighted per cent factor of every company in the index by the total of the values assigned for timeliness and safety, and this will give you the relevance for every stock in the index. Calculate the annualized yield of every stock and option considered for the portfolio and execute those with a high annualized yield and yet are in the higher relevance factor.

35. To minimize the risk to the portfolio, the financial manager must maintain a portfolio that has a total weighted value of all stocks that runs parallel to that of the index. To accomplish this, the portfolio must be well diversified so that the cross section runs parallel to that of the index, as determined by a computer program or calculations, yet has the highest total of relevance value of all the stocks for the portfolio possible.

36. The tax consequences of various trades must be considered and how they would affect the goals of the investor and should comply with the investor's goals as much as possible.

37. The total value of the portfolio and the amount of insurance required to protect it must be evaluated from time to time, and at least quarterly and then insured property, to comply with the investor's goals.

38. The financial manager shall use the following tools for investment purposes and decisions;

The Wall Street Journal—presently $295.00 per year
The Value Line Investment Survey—presently $570.00 per year
Dick Davis Digest—presently $140.00 per year
Money Magazine—presently $24.95 per year
Wall Street Digest—presently $72.00 per year
John Dessacurs Investors World—presently $195.00 per year
Standard & Poor's Monthly Stock Guide—presently free from broker
Short and Long Term "Options Analysis Scanner"—presently free from broker
Individual Stock Reports and Analysis—presently free from broker
Weekly Market Analysis and Industry Reports—presently free from broker 39. Before any puts are sold on a stock, determine what the potential gain is after paying the insurance required to cover the at-risk value of the put at its underlying value. This is done by determining what the annualized premium would be per $1,000.00 of underlying value, and then determining what the annualized insurance would be per $1,000.00 of underlying value. Deduct the cost of the insurance required from the amount of premium to be received, and this would be your net gain. Divide the net gain by the annualized premium received to give the percentage of gain for the transaction. If the net gain is not more than 25%, do not sell the put.

An example portfolio is illustrated in FIG. 7 as Table 1. This is a hypothetical portfolio which requires an investment of $500,000, and which meets the requirements of the second preferred embodiment of the invention. At the time the table was prepared, Jun. 12, 1997, these figures were the actual values for these stocks. A similar portfolio could be selected at any time based on the parameters of the invention.

In addition to the $500,000 initial investment to purchase stocks, money is borrowed against the portfolio to purchase stocks on margin.

The maximum amount to borrow against the portfolio is determined by the formula:

$$[(E-S)+PV] \times 0.5 \times (1.00-D) + 0.90G - I = \text{maximum amount}$$

In this formula, E equals the value of the stocks, also called long market value, of the portfolio and less U.S. Government securities if there are any. The value of E is $929,500.00 in this case, since there are no government securities. Note: The total of column 4 in Table 1 is the stock value plus commission. S equals the value of the options, also called the short market value of securities, $142,512.00 in this case. D equals the percent of market theoretical drop possible under extreme conditions expressed as a decimal, 0.042 in this case, plus premiums received or total of 0.1806%. This number is to be used as a parameter for the portfolio risk safety. G equals the total value of U.S. Government Securities, 0 in this case. I equals the cost of insurance needed to protect the portfolio of $1,029,500 in this case, or $35,815.00 annualized, as calculated below. PV=the total underlying value of puts. The calculation for maximum amount to be borrowed is thus:

dividend (column 5). Ten contracts (column 6) of covered calls are sold, with a strike date of Jan. 16, 1999 (column 7). The strike price is 60 (column 10). That means that the buyer of the call option can call for the stock at any time before Jan. 16, 1999, and the portfolio manager will have to sell it to the buyer for 60. That means that since the stock is priced at 61⅝, and the strike price is at 60, 1⅝ is the intrinsic value of the option. Since there are ten contracts and 1,000 shares in the portfolio, the intrinsic value of the Applied Materials call options is $1625.00. The premium received for selling the calls is $18,216.00 (column 12), which is the price received for the option less commission. Deducting the $1625.00 intrinsic value would leave $16,591.00 time value in the premium. The time value will gradually decrease over time so that on the strike date it will be zero. This time value plus the dividends on the stock are what is used in the system or method to make the yields higher, by double compounding or leveraging.

The cash from the premiums is put into the account in one day so it can be used to buy additional stock, and by getting the premium in cash you can reduce the base cost of the stock. By using the premium in this way, you are compounding the yield. Since the index puts are purchased to insure the portfolio, you can margin or safely borrow on the account to a high degree as long as the yield is higher than the interest you pay. This gives you a double compounding or leveraging of the yield.

Column 13 of Table 1 is titled "ANNUALIZED FAIRLY SECURE TOTAL". This figure is the time value left in the premium, plus any dividends now received, converted to an annualized basis. This means that since the strike date of the Applied Materials call options is Jan. 16, 1999, about 19 months from the date of the hypothetical portfolio, the annualized time value of the options contracts is the time value of the premium divided by the months until the strike date multiplied by 12. This calculation is S16,591/(593/365)=10,210.

$$[(929,000 - 142,512) + 237,500] \times .5 \times (1.00 - .1806) + .90 * 0 - 35,815 = [(786,488) + 237,000] \times .5 \times (.8194) - 35,815$$

$$= [(1,023,488)] \times .5 \times .8194 - 35,815$$

$$= 419,323 - 35,815$$

$$= 383,508$$

Thus, an additional $383,508 worth of stock can be purchased using margin in the existing stocks.

If insurance is determined to be needed, as at block 24 of FIG. 1A, the at-risk value of the portfolio is calculated at block 26.

The at-risk value of the stock portfolio is found by adding the purchase price of each stock, plus the commissions for their purchase, to the sum of the underlying value of all of the puts sold, after deducting the premiums for all options. In the example portfolio, the at risk value is:

934,892+(237,500-142,512)

=934,892+94988

=1,029,880

The first company in the suggested portfolio is Applied Materials. One thousand shares are shown as purchased for the portfolio (column 1). The stock price is listed as 61⅝ (column 3). The cost of the stock (column 4) is 1000 times the price, plus commission. For this stock there is no Column 14 is the amount that would be paid if the value of the stock goes up, and the options are called. In the case Bell Atlantic Corp., the stock was purchased at 74⅞ and the strike price was 75, so ⅛ per share would be received. ⅛×1000=$125.

The yields of Column 13 are "fairly secure" because of the purchase of puts. The returns of column 13 are what will result if the market stays level. If the market goes up, the gains shown in Column 14 will also be received.

If the market goes down, the portfolio is protected by the index puts purchased as insurance. It is even possible to make a higher rate of yield than if it remains steady. As an example of this, look at Bell Atlantic Corp., the second stock in TABLE 1. It is purchased at 74⅞, and the strike price is 75. The strike date is Jul. 18, 1997. All of the premium is time value, and it will not be called from the portfolio unless the price is over 75, so the portfolio can make an additional $125.00 if the price goes up, but no more, unless the option is repurchased and stepped up or rolled out to a later date.

To determine the total amount of insurance needed to cover the entire hypothetical portfolio of Table 1, the purchase price of all the stock before commissions is added up, and to that is added the amount of the underlying value of all of the puts sold. This gives you the gross, at-risk value of the portfolio. From that figure is deducted the amount of the premiums received, as the portfolio has already received that money, and if the market goes down the call options will just expire worthless. This then gives you the gross value of the portfolio that you need to protect to make sure you wouldn't lose any money if the market goes down. In this hypothetical portfolio based on real numbers at a certain point in time, the at-risk value would be $791,830.00 which is the total cost of the stock ($934,892.00) minus the total premiums received ($142,512.00). To this number the underlying value of the puts is added ($237,500.00) for an at-risk value of $1,029,880.00. The S&P 500 on that date was $883.48. To insure the portfolio, S&P 500—December, 1998, index puts would be purchased, which are in the money and as close to 883.48 as possible. The index put which satisfies those conditions on that day was the $875.00 put, which sold for $48 ½ per share. Since one contract is for 100 shares, one contract of these puts has a value of $87,500.00, and costs $4,850.00 for each contract. The annualized cost of this insurance is $58,200/(593/365 years)=$35,815.00.

The at-risk value of the portfolio, $1,029,880.00, is divided by $87,500.00, to get 11.76 contracts required to cover the value of the portfolio. Therefore, twelve contracts would be purchased for a value of $87,500.00 each. Twelve contracts at this price give a total protection of $1,050,000, which is slightly more than that needed to insure the at-risk value of the portfolio.

By selling the call options, the portfolio has a ceiling placed on the value of the portfolio, unless it is chosen to step up the call options at a later date if the market goes up. By buying the puts, the portfolio has placed a floor on the value of the portfolio. This has the effect of insuring the at-risk value of the portfolio, or placing a collar on it.

By freezing the value of the portfolio, the annualized fairly secure total from the premiums and dividends less any expense for interest and puts, is the assumed net for the year. In this case, it is a 34.087% assured annualized yield, or 38.333% if the market goes up a little and the portfolio can pick up the possible additional total. This return may not be expected all of the time, because the premiums are constantly changing on a minute-to-minute basis, but this system or method can be expected to normally produce an annualized yield over 20%, with no risk of loss from a market downturn.

If the market experiences a 20% downturn, the at-risk value of the portfolio would have gone down $205,866.00. The 12 contracts of December, 1998 S&P 500—$875.00 puts were all in the money, and each contract is for 100 shares. Therefore, each dollar downward deviation of the S&P 500 results in $100.00 increased value of the index puts. The portfolio has 12 contracts for index puts, so every dollar that the S&P 500 goes down, the value of the index puts goes up $1,200.00. If the market went down 20%, the S&P 500 would also go down 20° o. Twenty percent of $875.00=$175.00. A $175.00 drop×$1,200.00=$210,000.00 that the portfolio index puts would gain in value, which more than compensates for the decreased value of the stock. The portfolio would actually have a $4,134.00 overall gain with this 20% downturn, because it is slightly over insured. This would only happen if the market went down, and the puts are only purchased for the purpose of insurance. The portfolio has this value guaranteed until Dec. 19, 1998, and if the S&P 500 is above $875.00 at that time, the puts expire worthless and the portfolio has spent $58,200.00 for 1.625 years of $1,050,000.00 of insurance. The portfolio can exercise its puts by Dec. 19, 1998, and at that time the gross value of your stock plus the puts should equal $1,050,000.00 or more. If the value of the portfolio goes up, it can step up the strike price of the puts to give the portfolio greater coverage.

The gain in the portfolio is calculated in column 13 by adding all the annualized yields of each option and dividend. These add to $234,690.00. From this figure $35,815.00 is subtracted, the cost of index puts as insurance. $28,440.00 is further subtracted as the cost of interest on $350,030 borrowed on margin at a rate of 8⅛%. This results of an annualized net gain of $170,435.00 from a $500,000 investment. This $170,435/$500,000 equals a 34.087% annualized yield, which is assured even if the market goes down. If the market goes up, the gains shown in Column 14 will also be realized, for an additional $21,233.00. This would result in an annualized yield of 38.3330. These results are possible due to the double leveraging of the invention, by which a $500,000 investment can be used to purchase stocks with a value of $934,892.00, and insurance protects the portfolio from market downturns.

A second portfolio is shown in FIG. 8 as Table 2. Table 2 represents the first preferred embodiment of the invention, and is a portfolio which mirrors the Dow Jones Industrial Index by purchasing each stock on that index in the ratio in which it is represented in the index. The DJI is price weighted rather than capitalization weighted, as is the S&P 500, so stocking the portfolio with equal quantities of shares of each stock of the index results in proportional representation of the Index.

While there is shown and described the present preferred embodiment of the invention, it is to be distinctly understood that this invention is not limited thereto but may be variously embodied to practice within the scope of the following claims.

I claim:

1. An automated method of managing an investment portfolio which contains shares of stock purchased at various stock prices based on an index, and managed by an automated data processing system, comprising:

linking said automated manager by a data link to current stock information;

selecting an index which contains selected stocks in a ratio, against which to mirror a stock portfolio;

establishing portfolio parameters for need for and level of insurance protection, and mix of strike dates of options sold;

purchasing stock which is listed on said index to form an investment portfolio which is representative of said index;

selling covered calls on said stock in said stock portfolio to receive a premium;

using said premium from said covered calls to purchase additional stock, and selling covered calls on said additional stock to receive a premium;

using a means of determining an at-risk value of said portfolio which is to be insured from loss by a purchase of puts;

using a means of determining an amount of insurance to be purchased to insure said at-risk value of said portfolio against loss;

purchasing index puts which if exercised will be worth at least said at-risk value plus a safety factor, as insurance against a decrease in stock prices;

using a means of determining a maximum amount to be borrowed against said portfolio which is performed by calculating a formula $(E-S)(1.00-D)(0.5)+(0.90G)-I=$ Maximum Amount of Borrowing where E equals long market value of portfolio less U.S. Government securities;

S equals short market value of securities;

D equals percent of market theoretical drop possible under extreme conditions expressed as a decimal;

G equals total value of U.S. Government Securities; and

I equals the value of index puts in the portfolio borrowing a maximum amount against said stock portfolio by purchasing stock on margin and selling covered calls on said stock purchased on margin; and adjusting said at-risk value and amount of insurance to be purchased to account for additional stock purchased on margin; and periodically monitoring said portfolio for compliance with portfolio parameters.

2. The method of managing an investment portfolio of claim 1 which further comprises purchasing each stock of said selected index in a ratio equal to its representation in said index.

3. The method of managing an investing portfolio of claim 1 which further comprises selling covered calls in which ⅓ of said covered calls have strike dates of six months or less, ⅓ of said covered calls have strike dates of greater than six months and less than 12 months, and ⅓ of said covered calls are LEAPS, with strike dates of 12 months or longer.

4. The method of managing an investment portfolio of claim 1 which further comprises periodically calculating an annualized yield on positions of currently held options as well as stepped up and rolled out positions on currently held options, and selecting among currently held options, stepped up, or rolled out positions, for a position of highest annualized yield.

5. The method of managing an investment portfolio of claim 1 in which said means of determining said at risk value of said stock portfolio is performed by adding purchase price of each stock plus commissions to a value representing all puts sold, and deducting an amount representing premiums received.

6. The method of managing an investment portfolio of claim 1 in which said means of determining an amount and strike price of insurance to be purchased, in the form of index put options, against a decrease is performed by calculating the formulas $AMV(1.00+SC)=$ strike price to buy index put option;

$(A-P)(1.00+S)=$ value of index put to buy;

where A equals total value of all equities valued at a strike price;

AMV equals an "at the money" equals the current value of the chosen index;

S equals a first safety factor to cover a price increase of a limited number of stocks inconsistent with or faster than a stock index;

SC equals a second safety factor to cover a price decrease of a limited number of stocks insistent with or occurring more rapidly than stock index; and P=total premiums received from sale of options.

7. The method of managing an investment portfolio of claim 1 which further comprises periodically calculating a time value for each option in said portfolio, and a cumulative time value.

8. A method of managing an investment portfolio which contains shares of stock purchased at various stock prices based on an index, and managed by an automated manager, comprising:

linking said automated manager by a data link to current stock information;

selecting an index which contains selected stocks in a ratio, against which to mirror a stock portfolio;

establishing portfolio parameters for need for and level of insurance protection, and mix of strike dates of options sold;

purchasing stock which is listed on said index to form an investment portfolio which is representative of said index;

selling covered calls on said stock in said stock portfolio to receive a premium;

using a means of determining an at-risk value of said portfolio which is to be insured from loss by a purchase of index puts;

using a means of determining an amount of insurance to be purchased to insure said at-risk value of said portfolio against loss;

using said premium from said covered calls to purchase additional stock, and selling covered calls on said additional stock to receive a premium;

using a means of determining a maximum amount to be borrowed against said portfolio;

borrowing said maximum amount against said stock portfolio by purchasing stock on margin and selling covered calls on said stock purchased on margin;

adjusting said at-risk value and amount of insurance to be purchased to account for additional stock purchased on margin;

purchasing index puts which if exercised will be worth at least said at-risk value plus a safety factor, as insurance against a decrease in stock prices;

periodically calculating an annualized yield on positions of currently held options as well as stepped-up and rolled-out option positions on currently held options;

selecting among currently held options, stepped-up, or rolled-out option positions, for a position of highest annualized yield; and periodically monitoring said portfolio for compliance with portfolio parameters.

9. A method of managing an investment portfolio which contains shares of stock purchased at various stock prices based on an index, and managed by an automated manager, comprising:

linking said automated manager by a data link to current stock information;

selecting an index which contains selected stocks in a ratio, against which to mirror a stock portfolio;

establishing portfolio parameters for need for and level of insurance protection, and mix of strike dates of options sold;

establishing stock parameters for selected criteria, such as performance criteria, yield criteria, risk criteria, history criteria, growth history, and sector of operation;

generating a performance comparison of a number of stocks using a means of selection, the performance comparison to contain a first list of stock which meets said parameters, a second list of stock which comprises stocks which are in said portfolio, but no longer meet said portfolio or stock parameters, and a third list of valuable and over-priced stock which would be desirable to own at a lower price, the performance comparison to include the highest price at which said valuable and over-priced stock should be purchased;

purchasing shares of stock from said first list for inclusion in said stock portfolio, in a ratio which is representative of said stocks in said index.

selling stocks from said second list of stocks which are in said stock portfolio, but which no longer meet said parameters;

selling naked puts on valuable and over-priced stock from said third list;

selling covered calls on said stock in said stock portfolio to receive a premium using a means of determining an at-risk value of said portfolio which is to be insured from loss by a purchase of puts;

using a means of determining an amount of insurance to be purchased to insure said at-risk value of said portfolio against loss;

purchasing index puts, if indicated, which, if exercised, will be worth at least said at-risk value plus a safety factor, as insurance against a decrease in stock prices; and periodically monitoring said portfolio and stock for compliance with portfolio and stock parameters.

10. The method of managing an investment portfolio of claim 9 in which said means of selection is a relevance factor, which is a safety factor plus a timeliness factor divided into a weighting factor, with an annualized yield for each stock.

11. The method of managing an investment portfolio of claim 9 which further comprises using said premium from said covered calls to purchase additional stock, and selling covered calls on said additional stock to receive a premium.

12. The method of managing an investment portfolio of claim 9 which further comprises using a means of determining a maximum amount to be borrowed against said portfolio;

borrowing a maximum amount against said stock portfolio by purchasing stock on margin and selling covered calls on said stock purchased on margin; and adjusting said at-risk value and amount of insurance to be purchased to account for additional stock purchased on margin.

13. The method of managing an investment portfolio of claim 12 in which said means of determining a maximum amount to be borrowed against said portfolio is performed by calculating a formula $$[(E-S)+PV]\times 0.5\times(1.00-D)+0.90G-I=\text{Maximum Amount of Borrowing Allowed}$$

where E equals long term market value of portfolio less U.S. Government securities;

S equals short market value of securities;

D equals percent of market theoretical drop possible under extreme conditions expressed as a decimal;

G equals total value of U.S. Government Securities;

I equals cost of insurance needed to protect said portfolio;

PV=Total underlying value of puts.

14. The method of managing an investment portfolio of claim 9 which further comprises purchasing each stock of said selected index in a ratio equal to its representation in said index.

15. The method of managing an investing portfolio of claim 9 which further comprises selling covered calls in which ⅓ of said covered calls have strike dates of six months or less, ⅓ of said covered calls have strike dates of greater than six months to less than 12 months, and ⅓ of said covered calls are LEAPS with strike dates of 12 months or more.

16. The method of managing an investment portfolio of claim 9 which further comprises calculating an annualized yield on positions of currently held options as well as stepped-up and rolled-out positions on currently held options, and selecting among currently held options, stepped up, or rolled out positions, for a position of highest annualized yield.

17. The method of managing an investment portfolio of claim 9 in which said means of determining said at risk value of said stock portfolio is performed by adding purchase price of each stock plus commissions to a value representing all puts sold, and deducting an amount representing premiums received.

18. The method of managing an investment portfolio of claim 9 in which said means of determining an amount of insurance to be purchased against a decrease is performed by calculating the total at-risk value and purchasing long term index puts greater than or equal to said at-risk value.

19. The method of managing an investment portfolio of claim 9 which further comprises periodically calculating a time value for each option in said portfolio, and a cumulative time value.

20. A method of managing an investment portfolio which contains shares of stock purchased at various stock prices based on an index, and managed by an automated manager, comprising:

linking said automated manager by a data link to current stock information;

selecting an index which contains selected stocks in a ratio, against which to mirror a stock portfolio;

generating a performance comparison of a number of stocks using a means of selection, the performance comparison to contain a first list of stock which meets said parameters, a second list of stock which comprises stocks which are in said portfolio but no longer meet said parameters, and a third list of valuable and over-priced stock which would be desirable to own at a lower price, the performance comparison to include at what price said valuable and overpriced stock should be purchased;

purchasing shares of stock from said first list for inclusion in said stock portfolio, in a ratio which is representative of said stocks in said index;

selling stocks from said second list of stocks which are in said stock portfolio but which no longer meet said parameters;

selling naked puts on valuable and overpriced stock from said third list and using premium to purchase additional stock;

selling covered calls on said stock in said stock portfolio to receive a premium;

using a means of determining an at risk value of said portfolio which is to be insured from loss by a purchase of puts;

using a means of determining an amount of insurance to be purchased to insure said at risk value of said portfolio against loss;

using said premium from said covered calls to purchase additional stock, and selling covered calls on said additional stock to receive a premium;

using a means of determining a maximum amount to be borrowed against said portfolio;

borrowing said maximum amount against said stock portfolio by purchasing stock on margin and selling covered calls on said stock purchased on margin;

adjusting said at risk value and amount of insurance to be purchased to account for additional stock purchased on margin; purchasing puts which if exercised will be worth at least said at risk value plus a safety factor, as insurance against a decrease in stock prices;

periodically calculating an annualized yield on positions of currently held options as well as stepped up and rolled out option positions on currently held options;

selecting among currently held options, stepped up, or rolled out option positions, for a position of highest annualized yield; and periodically monitoring said portfolio for compliance with parameters.

21. A data processing system for managing an investment portfolio which contains shares of stock purchased at various stock prices, comprising:

computer processor means for processing data;

data storage means for storing data on a storage medium;

means for inputting of stock data to said data storage means;

means for selecting portfolio parameters for determining need for and level of insurance protection in the form of index puts, and mix of strike dates of options sold;

a portfolio manager which purchases stock for inclusion in said stock portfolio, sells covered calls on said stock in said stock portfolio to receive a premium, borrows at a maximum amount against said stock portfolio by purchasing stock on margin and selling covered calls on said stock purchased on margin, adjusts said at-risk value and amount of insurance to be purchased to account for additional stock purchased on margin, and purchases index puts as insurance and collects dividends;

a means of determining an at-risk value of said portfolio which is to be insured from loss by a purchase of puts;

a means of determining if market conditions require the purchase of index puts as insurance against a fall in market price of the portfolio stocks;

a means of determining an amount of insurance to be purchased to insure said at-risk value of said portfolio against loss;

a means of determining a maximum amount to be borrowed against said portfolio;

a group of purchased index puts which are purchased based on said amount of insurance needed to insure said at-risk value of said portfolio, which if exercised if the value of portfolio stocks is sufficiently depressed, will be worth said at-risk value plus a safety factor, as insurance against a decrease in stock prices;

a means for periodically monitoring said portfolio for compliance with portfolio parameters; and a means for generating a performance comparison of a number of stocks, based on a safety factor, a timeliness factor, a weighted percentage each stock represents in said index, and yield of said stock and options on said stock, the performance comparison to contain a first list of stock which meets said parameters, a second list of stock which comprises stocks which are in said portfolio but no longer meet said parameters, and a third list of valuable stock which would be desirable to own if its price were lower than the market price, the performance comparison also to include a maximum price at which said valuable stock should be purchased.

22. The data processing system for managing an investment portfolio of claim 21 in which said means of determining said at risk value of said stock portfolio is a formula $$(P+C+PS)-Pr$$

where P equals purchase price of each stock;

C equals commissions on stock purchases;

PS equals the value of all puts sold; and

Pr equals the total premiums received from covered calls sold.

23. The data processing system for managing an investment portfolio of claim 21 in which said means of determining an amount and the strike date of index puts to be purchased as insurance against a decrease in market price is performed by calculating the formulas $$AMV(1.00+SC)=\text{strike price to buy index put option};$$

$$(A-P)(1.00+S)=\text{value of index put to buy};$$

where A equals total value of all equities valued at a strike price;

AMV equals an "at the money" current value of the chosen index;

S equals a first safety factor to cover a price increase of a limited number of stocks inconsistent with or faster than a stock index;

SC equals a second safety factor to cover a price decrease of a limited number of stocks insistent with or occurring more rapidly than said stock index; and P=total premiums received from sale of options.

24. The data processing system for managing an investment portfolio of claim 21 in which said means of determining a maximum amount to be borrowed against said portfolio is performed by calculating a formula;

$$[(E-S)+PV] \times 0.5 \times (1.00-D) + 0.90G - I,$$

where E equals long term market value of portfolio less U.S. Government securities;

S equals short market value of securities;

D equals percent of market theoretical drop possible under extreme conditions expressed as a decimal;

G equals total value of U.S. Government Securities;

I equals cost of insurance needed to protect said portfolio;

PV=Total underlying value of puts.

25. The data processing system for managing an investment portfolio of claim 21 in which said means of determining if market conditions require the purchase of index puts as insurance is a test which determines if a PE of the Dow Jones Industrial Average is greater than 13 and Dividend Yield is less than 4.00%, and requires purchase of index puts if these conditions are true.

26. The method of managing an investment portfolio of claim 21 which further comprises periodically calculating a time value for each option in said portfolio, and a cumulative time value.

27. A method of managing an investment portfolio which contains shares of stock purchased at various stock prices based on an index, and managed by an automated manager, comprising:

linking said automated manager by data link to current stock information;

selecting an index which contains selected stocks in a ratio, against which to mirror a stock portfolio;

establishing portfolio parameters for need for and level of insurance protection, and mix of strike dates of options sold;

generating a performance comparison of a number of stocks using a means of selection, the performance comparison to contain a first list of stock which meets said parameters, and a second list of stock which comprises stocks which are in said portfolio, but no longer meet said portfolio parameters;

purchasing shares of stock from said first list for inclusion in said stock portfolio, in a ratio which is representative of said stocks in said index;

selling stocks from said second list of stocks which are in said stock portfolio, but which no longer meet said parameters;

selling covered calls on said stock in said stock portfolio to receive a premium;

using a means of determining an at-risk value of said portfolio which is to be insured from loss by a purchase of puts;

using a means of determining an amount of insurance to be purchased to insure said at-risk value of said portfolio against loss;

purchasing index puts if indicated which, if exercised, will be worth at least said at-risk value plus a safety factor, as insurance against a decrease in stock prices; and periodically monitoring said portfolio for compliance with portfolio parameters.

28. The method of managing an investment portfolio of claim 27 which further includes generating a performance comparison which includes a third list of valuable and over-priced stock which would be desirable to own at a lower cost, the performance comparison to include the highest price at which said valuable and over priced stock should be purchased;

selling naked puts on valuable and over-priced stock from said third list; and using a premium from said selling to naked puts to purchase additional stock, and for selling covered calls.

29. An automated portfolio management system comprising:

a computer for processing data;

a database which operates on said computer, for the manipulation and storage of data;

a means of populating said database with data from a network or Internet;

data storage means for storing database data;

data display means for displaying data;

a portfolio of stocks which represents a selected stock index, and which has an at risk value;

a portfolio of options sold on said stocks;

a means of determining an amount of insurance to be purchased to insure said at risk value of said portfolio against loss;

one or more index puts which insure said portfolio against a possibility of loss of value to a degree approximately equal to said at risk value; and a means of specifying selected strike prices and strike dates corresponding to currently held options in said portfolio, and automatically and periodically calculating an annualized yield on positions of currently held options and comparing said annualized yield with yields of said selected stepped up and rolled out positions, and allowing a user to select a preferred position from among said compared positions.

30. An automated portfolio management system comprising:

a computer for processing data;

a database which operates on said computer, for the manipulation and storage of data;

a means of populating said database with data from a network or Internet;

data storage means for storing database data; and data display means for displaying data;

a portfolio of stocks and options;

a means of determining an amount and strike price of insurance to be purchased, in the form of index put options, against a decrease in value of said portfolio which is performed by calculating the formulas $AMV(1.00+SC)$=strike price to buy index put option;

$(A-P)(1.00+S)$=value of index put to buy;

where A equals total value of all equities valued at a strike price;

AMV equals an "at the money" equals the current value of the chosen index;

S equals a first safety factor to cover a price increase of a limited number of stocks inconsistent with or faster than a stock index;

SC equals a second safety factor to cover a price decrease of a limited number of stocks insistent with or occurring more rapidly than said stock index; and P=total premiums received from sale of options.

31. An automated portfolio management system comprising:

a computer for processing data;

a database which operates on said computer, for the manipulation and storage of data;

a means of populating said database with data from a network or Internet;

data storage means for storing database data; and data display means for displaying data;

a portfolio of stocks and options purchased with cash and on margin;

a means of determining a maximum amount to be borrowed against said portfolio on margin is performed by calculating a formula $[(E-S)+PV] \times 0.5 \times (1.00-D)+0.90G-I$=Maximum Amount of Borrowing Allowed where E equals long term market value of portfolio less U.S. Government securities;

S equals short market value of securities;

D equals percent of market theoretical drop possible under extreme conditions expressed as a decimal;

G equals total value of U.S. Government Securities;

I equals cost of insurance needed to protect said portfolio; and

PV=Total underlying value of puts.

32. An automated portfolio management system comprising:

a computer for processing data;

a database which operates on said computer, for the manipulation and storage of data;

a means of populating said database with data from a network or Internet;

data storage means for storing database data; and data display means for displaying data;

a portfolio of stocks and options purchased with cash and on margin; and a means of selection of stock for said portfolio which comprises a relevance factor, which is a safety factor plus a timeliness factor divided into a weighting factor, combined with an annualized yield for each stock.

33. An automated portfolio management system comprising:

a computer for processing data;

a database which operates on said computer, for the manipulation and storage of data;

a means of populating said database with data from a network or Internet;

data storage means for storing database data; and data display means for displaying data;

a portfolio of stocks and options purchased with cash and on margin;

index puts purchased as insurance against loss of value in said portfolio;

a means of determining an amount and the strike date of index puts to be purchased as insurance against a decrease in market price which is performed by calculating the formulas $$AMV(1.00+SC) = \text{strike price to buy index put option;}$$

$$(A-P)(1.00+S) = \text{value of index put to buy;}$$

where A equals total value of all equities valued at a strike price;

AMV equals an "at the money" current value of the chosen index;

S equals a first safety factor to cover a price increase of a limited number of stocks inconsistent with or faster than a stock index;

SC equals a second safety factor to cover a price decrease of a limited number of stocks insistent with or occurring more rapidly than said stock index; and P=total premiums received from sale of options.

34. An automated portfolio management system comprising:

a computer for processing data;

a database which operates on said computer, for the manipulation and storage of data;

a means of populating said database with data from a network or Internet;

data storage means for storing database data; and data display means for displaying data;

a portfolio of stocks and options purchased with cash and on margin;

a means of determining a maximum amount to be borrowed against said portfolio is performed by calculating a formula $$[(E-S)+PV] \times 0.5 \times (1.00-D) + 0.90G - I,$$

where E equals long term market value of portfolio less U.S. Government securities;

S equals short market value of securities;

D equals percent of market theoretical drop possible under extreme conditions expressed as a decimal;

G equals total value of U.S. Government Securities;

I equals cost of insurance needed to protect said portfolio; and

PV=Total underlying value of puts.

35. An automated portfolio management system comprising:

a computer for processing data;

a database which operates on said computer, for the manipulation and storage of data;

a means of populating said database with data from a network or Internet;

a portfolio containing stocks and options;

a means of periodically calculating the remaining time value of each position in said portfolio and a total time value of said portfolio;

a means of specifying selected strike prices and strike dates corresponding to currently held options in said portfolio and automatically and periodically calculating an annualized time value and yield based on time value only and comparing annualized yield on positions of currently held options and comparing said annualized yield with yields of selected stepped up or rolled out positions and allowing a user to select a preferred position from among said compared positions;

data storage means for storing database data; and data display means for displaying data.

* * * * *